(12) United States Patent
Hebbagodi

(10) Patent No.: US 12,695,769 B2
(45) Date of Patent: Jul. 28, 2026

(54) ADAPTIVE SYSTEM FOR NETWORK AND SECURITY MANAGEMENT

(71) Applicant: Netenrich, Inc., San Jose, CA (US)

(72) Inventor: Praveen Hebbagodi, Jayanagar (IN)

(73) Assignee: Netenrich, Inc., San Jose, CA (US)

( * ) Notice: Subject to any disclaimer, the term of this patent is extended or adjusted under 35 U.S.C. 154(b) by 396 days.

(21) Appl. No.: 18/326,829

(22) Filed: May 31, 2023

(65) Prior Publication Data

US 2023/0396638 A1 Dec. 7, 2023

Related U.S. Application Data

(60) Provisional application No. 63/348,935, filed on Jun. 3, 2022.

(51) Int. Cl.
H04L 9/40 (2022.01)
G06F 16/28 (2019.01)
(52) U.S. Cl.
CPC ........ H04L 63/1425 (2013.01); G06F 16/285 (2019.01); H04L 63/1408 (2013.01); H04L 63/1416 (2013.01); H04L 63/1433 (2013.01); H04L 63/1466 (2013.01); H04L 63/20 (2013.01)
(58) Field of Classification Search
CPC ............. H04L 63/1425; H04L 63/1408; H04L 63/1416; H04L 63/1433; H04L 63/1466; H04L 63/20; G06F 16/285; G06F 21/554
See application file for complete search history.

(56) References Cited

U.S. PATENT DOCUMENTS

| | | | |
|---|---|---|---|
| 11,258,805 B2 | 2/2022 | Nguyen et al. | |
| 11,283,830 B2 | 3/2022 | Vasseur et al. | |
| 11,627,153 B2 | 4/2023 | Gamble et al. | |
| 11,637,844 B2 | 4/2023 | Shenoy et al. | |
| 11,792,229 B2 | 10/2023 | Crabtree et al. | |
| 11,863,578 B1 * | 1/2024 | Speck ................... | G06N 5/022 |
| 11,997,122 B2 | 5/2024 | Lowney et al. | |
| 12,099,428 B1 | 9/2024 | Agarwal et al. | |
| 12,143,389 B1 | 11/2024 | Edison et al. | |
| 12,184,697 B2 | 12/2024 | Crabtree et al. | |
| 12,206,693 B1 | 1/2025 | Apostolopoulos | |
| 12,407,712 B2 | 9/2025 | Bazalgette et al. | |

(Continued)

FOREIGN PATENT DOCUMENTS

| | | | | | |
|---|---|---|---|---|---|
| CN | 112039841 A | * | 12/2020 | ......... | H04L 63/1416 |
| CN | 113422776 A | * | 9/2021 | ......... | H04L 63/1416 |

OTHER PUBLICATIONS

English language translation of Chinese Patent CN-113422776-A (10 pages) (Year: 2021).*

(Continued)

*Primary Examiner* — Amir Mehrmanesh
*Assistant Examiner* — Thomas A Gyorfi
(74) *Attorney, Agent, or Firm* — Davis Wright Tremaine LLP

(57) ABSTRACT

Systems and methods are described for identifying computer risk. A system may receive a set of input signals from third party sources. The system may characterize the input signals to derive an attack graph. The system may then emulate a threat or attack based on the attack graph. After emulation, the system may determine a risk score based on the attack graph.

26 Claims, 13 Drawing Sheets

(56) References Cited

U.S. PATENT DOCUMENTS

| | | | |
|---|---|---|---|
| 2016/0205122 A1* | 7/2016 | Bassett | H04L 63/1441 |
| | | | 726/23 |
| 2017/0171245 A1 | 6/2017 | Lee et al. | |
| 2018/0278643 A1 | 9/2018 | Peteroy et al. | |
| 2019/0068627 A1 | 2/2019 | Thampy | |
| 2019/0098037 A1 | 3/2019 | Shenoy, Jr. et al. | |
| 2019/0124104 A1* | 4/2019 | Apostolopoulos | |
| | | | G06F 16/9024 |
| 2019/0190945 A1 | 6/2019 | Jang et al. | |
| 2019/0294786 A1 | 9/2019 | Villavicencio et al. | |
| 2019/0319980 A1 | 10/2019 | Levy et al. | |
| 2020/0036684 A1 | 1/2020 | Thompson et al. | |
| 2020/0162472 A1 | 5/2020 | Zadeh | |
| 2020/0175175 A1* | 6/2020 | Hadar | G06F 21/70 |
| 2020/0327223 A1 | 10/2020 | Sanchez et al. | |
| 2020/0358804 A1 | 11/2020 | Crabtree et al. | |
| 2020/0412758 A1 | 12/2020 | Trivellato et al. | |
| 2021/0092141 A1 | 3/2021 | Gamble et al. | |
| 2021/0152576 A1 | 5/2021 | Groves et al. | |
| 2021/0211452 A1 | 7/2021 | Patel et al. | |
| 2021/0273957 A1 | 9/2021 | Boyer et al. | |
| 2022/0263860 A1* | 8/2022 | Crabtree | H04L 63/1425 |
| 2022/0318384 A1 | 10/2022 | Hatekar et al. | |
| 2022/0321540 A1 | 10/2022 | Loman et al. | |
| 2023/0009127 A1 | 1/2023 | Boyer | |
| 2023/0033117 A1 | 2/2023 | Lowney et al. | |
| 2023/0094735 A1 | 3/2023 | Krasnov | |
| 2023/0109926 A1 | 4/2023 | Nair et al. | |
| 2023/0315991 A1 | 10/2023 | Zhang et al. | |

OTHER PUBLICATIONS

English language translation of Chinese Patent CN-112039841 (12 pages) (Year: 2020).*

Ahmed et al., "Reduction of Alert Fatigue using Extended Isolation Forest", 2021 International Conference on Forensics, Analytics, Big Data and Security, pp. 1-5.

Ban et al., "Combat Security Alert Fatigue with AI-Assisted Techniques", The 2021 12th International Conference on E-Business, Management and Economics, pp. 9-16.

International Search Report and Written Opinion issued in application No. PCT/US2023/024026 on Sep. 7, 2023.

Othman, "Supervised Scoring with Monotone Multidimensional Splines," Proceedings of the Twenty-Eighth AAAI Conference on Artificial Intelligence, 2014, 7 pages.

USPTO Non-Final Office Action dated Jul. 3, 2025, U.S. Appl. No. 18/326,792, 29 pages.

USPTO Non-Final Office Action dated May 7, 2025, U.S. Appl. No. 18/326,843, 22 pages.

USPTO Non-Final Office Action dated Sep. 11, 2025, U.S. Appl. No. 18/326,725, 6 pages.

USPTO Final Office Action dated Dec. 23, 2025, U.S. Appl. No. 18/326,843, 18 pages.

* cited by examiner

CLIENT DEVICES

102

104

ANALYST DEVICES

NETWORK

106

THIRD PARTY SERVICE PROVIDER(S)

108

(1) INPUT SETS

NETWORK-BASED SERVICE

110

(1) OBTAIN SET OF INPUTS;
(2) GENERATE SET OF VECTOR OF ATTRIBUTES;
(3) MODIFICATION/ TRANSFORMATION OF VECTORS
(4) CLUSTER SET OF VECTORS;
(5) PROCESSING AND ASSESSMENT

100

400

EVENT SIGNAL PROCESSING ROUTINE

402

RECEIVE/RETRIEVE SIGNAL INPUTS

404

NORMALIZE THE SIGNAL INPUTS

406

CLASIFY THE NORMALIZED SIGNAL INPUTS

408

GENERATE VECTORIZED DATA BASED ON CLASSIFIED AND NORMAIZED SIGNAL INPUTS

410

GENERATE CLUSTERS OF ALERTS BASED BY IDENTIFYING SIMILARITIES OF EXISTING ALERTS

END

400

THREAT HUNTING ROUTINE
700

DETERMINE HYPOTHESIS (REACTIVE) OF THREAT OR ATTACK BASED ON CURRENT NETWORK ENVIRONMENT
702

DETERMINE HYPOTHESIS (PROACTIVE) OF THREAT OR ATTACK BASED ON RISK PROFILE OF ENTRY POINTS
704

DETERMINE HYPOTHESIS (THRESHOLD) OF THREAT OR ATTACK BASED ON ATTACK PATH PREDICTIONS
706

END

700

ADAPTIVE SYSTEM FOR NETWORK AND SECURITY MANAGEMENT

CROSS-REFERENCE TO RELATED APPLICATION

This application claims the benefit of U.S. Provisional Application No. 63/348,935, entitled ADAPTIVE SYSTEM FOR NETWORK AND SECURITY MANAGEMENT and filed on Jun. 3, 2022. U.S. Provisional Application No. 63/348,935 is incorporated by reference in its entirety.

BACKGROUND

Generally described, computing devices and communication networks can be utilized to exchange data or information. In a common application, a computing device can request content from another computing device via the communication network. For example, a client having access to a computing device can utilize a software application to interact with one or more computing devices via the network (e.g., the Internet). In such embodiments, the client's computing device can be referred to as a client computing device, and the server computing device can be referred to as a network service provider or network service.

Some network service providers can implement one or more individual services that may be configured to monitor the execution of individual services made accessible to client computing devices or utilized in servicing/interacting with client computing devices. Such network monitoring services may be configured in a manner to identify potential errors, faults, and intrusions in the execution of a network environment. Additionally, network monitoring services may be further configured to attempt to mitigate or resolve identified errors, faults and intrusions.

Network service providers may also implement one or more individual services that may be configured to monitor the interaction of client computing devices with a network environment. Such monitoring services, referred to generally as security services, may be specifically configured to identify potential communications or interactions between client devices and the network environment that would be considered to be malicious or harmful to the operation of the network environment. For example, a network security service may attempt to identify and mitigate potential malicious activity that could attempt to disrupt the operation of the network environment, gain access to unauthorized data, gain control of network-based resources, and the like.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
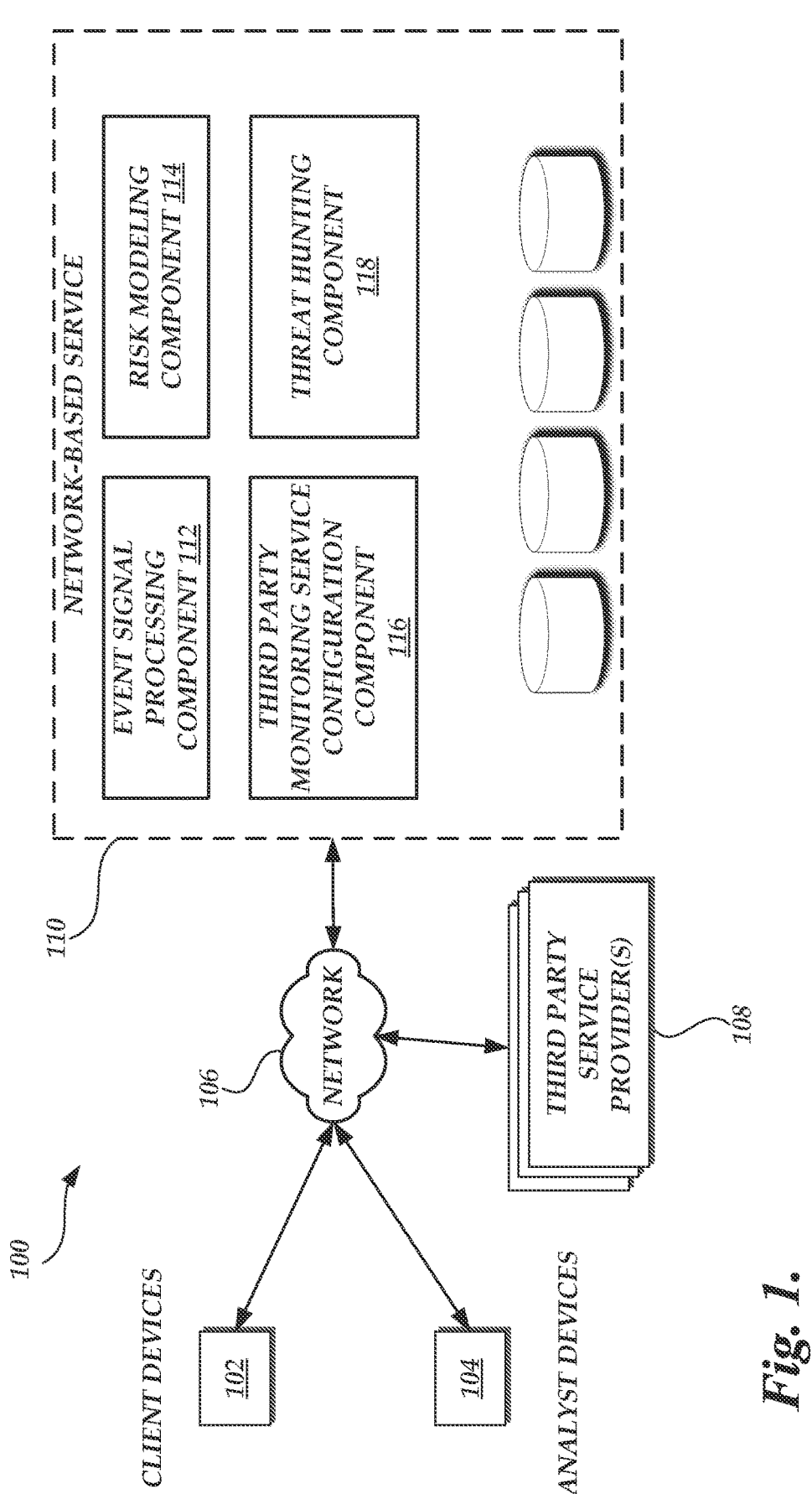
FIG. 1 is a block diagram of a network environment that includes one or more devices associated with customer/clients that can interact with one or more network services, one or more devices associated with analysts or administrators that can also interact with one or more network services, one or more third-party services that can provide or provision input signals as described herein, and a service provider for processing or configuring machine learned algorithms for processing input signals according to one or more embodiments.

Generally described, challenges faced by traditional implementations of network management can correspond to an overload of signals and alerts from various systems. For example, receiving and managing continuous alerts increases "alert fatigue." This can result in the system, and associated administrative personnel, overlooking critical alerts or misinterpreting the magnitude or severity of alerts. Such instances of alert fatigue can lead to network outages in communication networks. Additionally, instances of alert fatigue can result in data breaches or other forms of security events, such as cyber-attacks, etc.

Some existing approaches in both network security and network management are predominantly rules-based systems. Such approaches may utilize some form of a machine-learned algorithms for provisioning such rules or in enrichment of data. In some approaches, such rules-based systems may utilize network-based data resources, often referred to as cloud environments. Such cloud environments may be configured to collect individual data from different systems and make the data available for security and management monitoring. However, setting up and continuously tuning the monitoring and observability platforms for many cloud environments can be very time consuming and typically corresponds to a high skill activity. Traditional implementations of configuration approaches for monitoring and collection systems can include manual configuration of such systems. This approach typically requires higher degree of knowledge and skill in administrative personal and may be more vulnerable to errors or faults. Additionally, such manual configuration approaches are generally static in nature in either pre-defining the configuration of the network monitoring and collection systems. Still further, manual configuration approaches typically process larger amounts of collected data, which increases service provider costs and resource consumption in processing larger data sets.

With regard to implementations of network security implementations, the concept of risk modeling can be generally characterized as a process in which potential threats to the operation of a network activity can be identified and enumerated to allow for potential mitigation or countermeasures to be developed or executed. Generally described, risk modeling is considered a human intensive activity requiring a high degree of knowledge of network environments and associated security activities. Threat modeling typically involves several iterations between risk modeling teams, stake holders and architects. Some approaches to risk modeling tools correspond to simulation environment for developing and simulation potential threat activity. In a related aspect, threat hunting is another concept in which security threats are proactively identified and prioritized prior to occurrence. Generally described, by definition, threat hunting is a human driven activity, primarily focusing on identifying potential threats and confirms threat potential by processing logs and alerts from various systems. Threat hunting typically requires a high degree of skill to implement and is not generally scalable or suitable for automation.

To address at least some portion of the above-identified deficiencies, one or more aspects of the present application corresponds to a machine-learning-based architecture for network monitoring and security monitoring. Illustratively, the machine-learning-based architecture obtains a set of inputs from a wide variety of input sources, which may be generally described as input signals. The input signal may be correlated into a common data repository or set of repositories.

The machine-learning-based architecture then generates processing results from the input signals that correspond to vectorized data. The vectorized data can be further processed into clusters of alerts. The resulting clusters of alerts can then be sorted and scored, such as using a curve fitting algorithm or threat intelligence markers, illustratively without having to configure rules.

In accordance with aspects of the present application, the machine-learning-based architecture can include functionality that continuously fine tunes and configures network monitoring and collection systems. Illustratively, the network monitoring and collection systems can provide the inputs signals, as described above. As previously described, traditional implementations of configuration approaches for monitoring and collection systems can include manual configuration of such systems. This approach typically requires a higher degree of knowledge and skill in administrative personal and may be more vulnerable to errors or faults. Additionally, such manual configuration approaches are generally static in nature in either pre-defining the configuration of the network monitoring and collection systems. Still further, manual configuration approaches typically process larger amounts of collected data, which increases service provider costs and resource consumption in processing larger data sets. This also reduces the usage of these monitoring tools to focus on measuring what matters most for an organization, bringing down the operational costs of tools and monitoring efforts.

In accordance with still further aspects of the present application, the machine-learning-based architecture can include a multi-level approach to automating risk modeling. Illustratively, the multi-level approach includes modeling of entry points of attackers for a network environment. The entry points can illustratively include information based on identifiable entities (e.g., people and identities) and information based on infrastructure and digital assets. The multi-level approach further includes modeling of high value assets which are targets for the attackers. Illustratively, a characterization of value (e.g., high value, low value, etc.) can be based on characterization of the likely impact to the network environment based on a successful attack/disruption.

The multi-level approach can further include emulation of the modeled adversary behavior to determine the attack paths to targets within the architecture. Illustratively, the modeled attack paths correspond to a combination of the modeled entry points and value targets, such as entities including users, machines, certificates, etc., that are part of the attack path. Some of these entities will be marked as critical based on its blast-radius using graph analytics algorithms, e.g., high value targets. The modeled attack paths can also identify potential additional or dependent steps that would need to be completed to complete the attack or otherwise escalate the severity of the attack.

Finally, the illustratively multi-level approach includes scoring attack paths that meet the threshold will be added as part of the attack graph for the organizations. This will be used to analyze and determine the current cyber situational awareness, which includes key metrics like least time to compromise, high value targets, etc. Illustratively, a scoring subsystem can implement various scoring methodologies. For example, in one embodiment, scoring can be classified into six distinct categories in which three score categories characterize severity levels and three indicate absence of security.

Additionally, in some embodiments, the scoring subsystem can be implemented as an inverted binary tree. In such embodiments, individual tree nodes may represent individual scoring system instances that can process multiple categories (e.g., two) at a single time. Still further, curve fitting models may be employed.

In accordance with still further aspects of the present application, the machine-learned-based architecture can illustratively integrate the outcomes of the modeling effort for ongoing threat detection and threat hunting processing results. Illustratively, the machine-learned-based architecture utilizes security threat hypotheses to evaluate and identify security threats. In some embodiments, three different types of threat hunting hypotheses. A first type of threat hypothesis can be based on a current state of the network environment under observation. This type of threat hypothesis can be characterized as reactive. A second type of threat hypothesis can be characterized as proactive threat hunting. The second threat hypothesis type can be based on changes to the risk profile of entry points and published or known vulnerabilities that might impact the modeled network environment. The third type of threat hypothesis can be based on attack path predictions, that are critical and cross certain thresholds. Accordingly, in some embodiments, the machine-learned-based architecture implements management workflows and data integrations regarding information from threat hunting systems that needs to be recorded in the case management systems. The resulting processing results generates relevant, prioritized (with evidence) hypotheses. In some embodiment, the processing results can include recommendations for identifying threat indicators or setting up methodologies for detection. In other embodiments, the hypotheses are presented to human analysts in user interfaces designed for threat hunting.

Although aspects of the present disclosure will be described with regard to illustrative network components, interactions, and routines, one skilled in the relevant art will appreciate that one or more aspects of the present disclosure may be implemented in accordance with various environments, system architectures, external computing device architectures, and the like. Similarly, references to specific devices, such as a client computing device, can be considered to be general references and not intended to provide additional meaning or configurations for individual external computing devices. Still further, reference to types of network services or third-party content is intended to be illustrative in nature and should not be considered limiting. Additionally, the examples are intended to be illustrative in nature and should not be construed as limiting.

FIG. 1 is a block diagram of a network environment 100 that includes one or more devices associated with customer/clients that can interact with one or more network services, one or more devices associated with analysts or administrators that can also interact with one or more network services, one or more third-party services that can provide or provision input signals as described herein, and a service provider for processing or configuring machine learned algorithms for processing input signals according to one or more embodiments. The environment 100 includes a plurality of devices 102 utilized by clients or customer, generally referred to as client devices 102, to access network monitoring and security services. Client devices 102 may include any number of different computing devices capable of communicating with the network 106, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like.

The environment 100 includes a plurality of devices 104 or network of devices utilized by individual analysts or system administrators, generally referred to as analyst computing devices 104, to interact with one or more of the network services described herein. Similar to client computing devices 102, the analyst computing devices 104, may include any number of different computing devices capable of communicating with the network 106, via a direct connection or via an intermediary. For example, the analyst computing devices 104 may also correspond to a laptop or tablet computer, personal computer, wearable computer, server, personal digital assistant (PDA), hybrid PDA/mobile phone, mobile phone, Internet of Thing ("IoT") devices, virtual reality or augmented reality devices, and the like. Each content provider applications 104 may optionally include one or more data stores (not shown in FIG. 1) including various applications or computer-executable instructions, such as web browsers or media player software applications, used to implement the embodiments disclosed herein.

Network 106 may be any wired network, wireless network, or combination thereof. In addition, the network 106 may be a personal area network, local area network, wide area network, cable network, fiber network, satellite network, cellular telephone network, data network, or combination thereof. In the example environment of FIG. 1, network 106 is a global area network (GAN), such as the Internet Protocols and components for communicating via the other aforementioned types of communication networks are well known to those skilled in the art of computer communications and thus, need not be described in more detail herein. While each of the client devices 102, the content provider applications 104, and the network service 110 are depicted as having a single connection to the network 106, individual components of the client devices 102, the content provider applications 104, and the network service 110 may be connected to the network 106 at disparate points. Accordingly, communication times and capabilities may vary between the components of FIG. 1. Likewise, although FIG. 1 is illustrated as having a single network 106, one skilled in the relevant art will appreciate that the environment 100 may utilize any number or combination of networks.

As further illustrated in FIG. 1, the environment further includes one or more third-party service providers 108 that can host network environments on behalf of customers, such as users corresponding to client computing devices 102. The third-party service providers 108 can further host one or more network services that can collect and collate input signals utilized by the network services. Such collected and collated input signals can include log files, performance metric information, alert data, configuration data, trace data, and the like. Individual third-party providers may include interfaces for receiving configuration information regarding the collection of information, such as processing rules, machine-learned algorithms, content generation systems, or additional settings. The third-party providers may also provide interfaces, such as application programming interfaces (APIs) that can transmit input signals to the network services, as described in various embodiments herein.

Illustratively, in some embodiments, input signals from the third-party service providers 108 may be either inline (e.g., streaming) or offline. Inline input signals may be signals that are provided to the network services in real time, or near real time, (e.g., wire-speed within a data pipeline). For example, inline input signals may describe the current workloads managed by an operations team (e.g., open versus closed tickets in information technology (IT) service management or (ITSM) systems) of the network services. With inline input signals, the network services may be configured to adhere to user-specified policies (e.g., user created rules) and effectively sets bounds or exceptions for a machine learning-based system. For example, a user-specified policy may dictate: "do not correlate any signals impacting machines with tags 'tagging'." This policy-based approach may ensure that the policy respects organizational constraints and requirements of the entities (e.g., companies) associated with the network services.

Offline input signals may describe the facilitated analysis of historical data over extended timeframes. Offline input signals may be used by the network services to detect long-term patterns or trends, such as identifying ongoing attacks in cybersecurity (e.g., concerning a specific type of industry or type of device(s)) or discerning the root cause of multiple signals in IT or DevOps contexts. For example, offline input signals (e.g., history of memory utilization of computing resources) may be used by the network services to reveal that upgrading storage space, rather than cleaning the disk, is the appropriate response to a series of "disk full" offline input signals collected over a period of time.

The third-party service providers 108 can illustratively correspond to network monitoring services or security monitoring services, or a combination thereof. In accordance with aspects of the present application, the implementation of the service providers 108 may be independent of the service provider 110 such that operation of the service provider 110 may be considered agnostic to the service providers 110. Additionally, in some embodiments, the service provider 110 may implement or interact with third-party service providers 108 according to a multi-tenant implementation in which multiple third-party service providers may be utilized to provider input data. Other embodiments may include specific optimization or configurations unique to individual third-party service providers or sets of third-party service providers.

The third-party service providers 108 are logically illustrated as single components for purposes of simplicity. Illustratively, each individual third-party service provider 108 may be implemented in a number of different instantiated components, including virtualized resources. Accordingly, each third-party service provider 108 may correspond to a plurality of devices or virtual machine instances that are configured to implement different types of recommendations.

In accordance with embodiments, the network service 110 includes one or more servers for receiving content from the client devices 102 for processing input signals from the third-party service providers 108 and generating one or more additional network or security related functions. As described in further detail below, the network service 110 includes an event signal processing component 112, a risk modeling processing component 114, a third-party monitoring services configuration component 116, and a threat hunting processing component 118. The event signal processing component 112 includes illustrative components for configuring of one or more machine learning models to analyze input signals and generate attributes of vectors characterizing and sorting the inputs signals. The risk modeling processing component 114 includes illustrative components for configuring of one or more machine learning models to utilize the input signal vectors to generate models related to characterization of value of assets and likelihood of threats in assessment of network environment risk as described herein. The third-party monitoring services configuration component 116 includes illustrative components for configuring one or more machine-learned algorithms for configuring third-party content sources related to input sources as describe herein. The threat hunting processing component 118 can correspond to machine-learned algorithms for generating configurations to third-party content provider to select the configurations for generating various input signals used in one or more aspects of the present application. The threat hunting processing component 118 includes illustrative components for configuring machine-learned models for development and analysis of hypothesis as described herein. Although the various services 112-118 associated with the network service 110 are illustrated as single components, each individual service 112-118 may be implemented in a number of different instantiated components, including virtualized resources.

The network service 110 further can include a number of data stores for maintaining different information related to the execution and processing results generated by each of the individual network services 112-118 and the network service 110 in general. Although illustrated or referred to as individual data stores, the data stores can correspond to multiple data stores, distributed data stores, or variations thereof.

It will be appreciated by those skilled in the art that the environment 100 may have fewer or greater components than are illustrated in FIG. 1. Thus, the depiction of the environment 100 in FIG. 1 should be taken as illustrative. For example, in some embodiments, components of the network service 110 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the network service 110 as being implemented in multiple geographic areas. Additionally, not all geographic areas hosting portions of the network service 110 will necessarily have all the same components or combination of components.

Figure 2A:
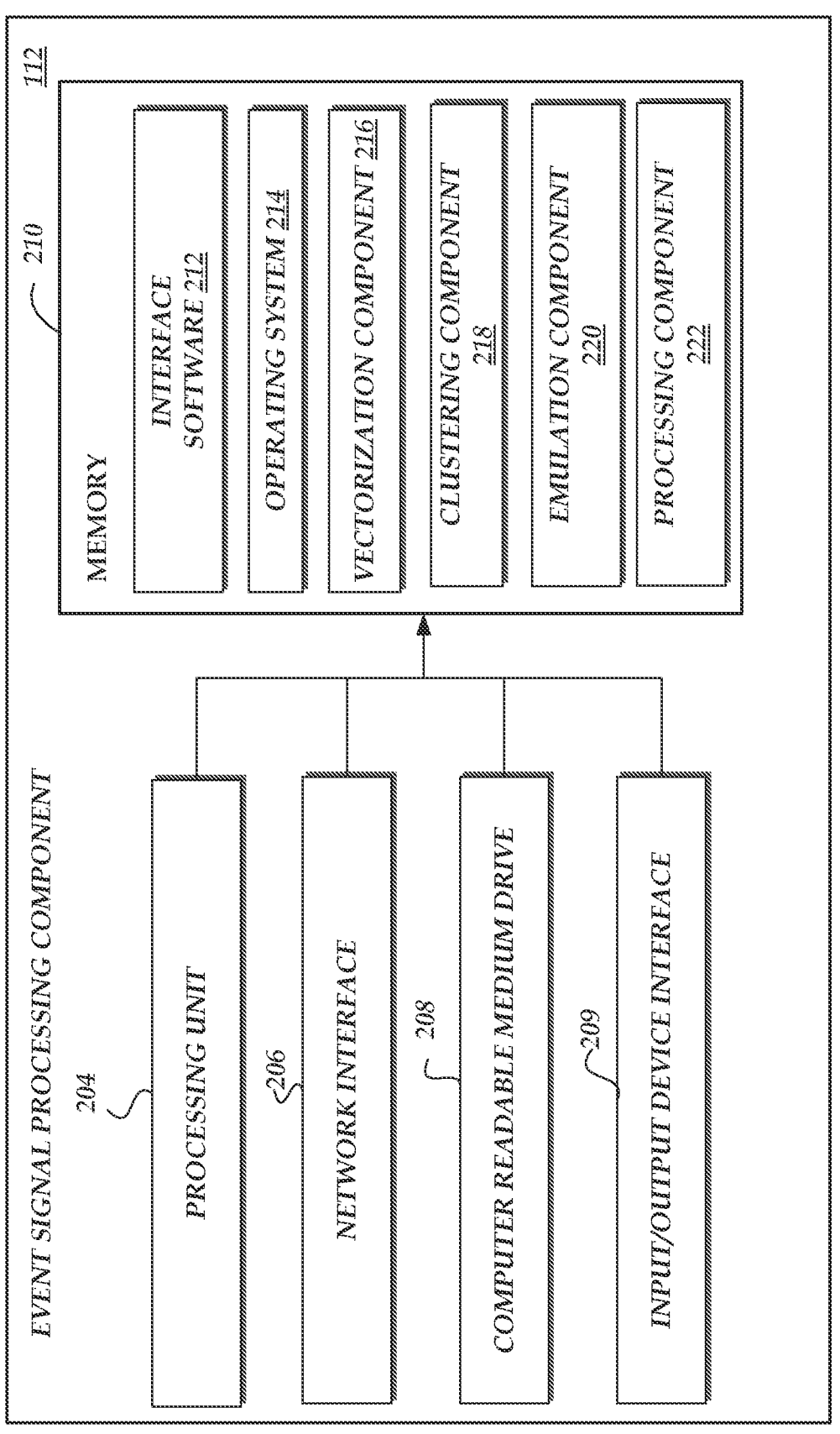
FIG. 2A depicts one embodiment of an architecture of an event signal processing component in accordance with one or more aspects of the present application.

FIG. 2A depicts one embodiment of an architecture of an event signal processing component 112. The general architecture of the event signal processing component 112 depicted in FIG. 2A includes an arrangement of computer hardware and software components that may be used to implement aspects of the present disclosure. As illustrated, the event signal processing component 112 includes a processing unit 204, a network interface 206, a computer readable medium drive 208, and an input/output device interface 209, an optional display 202, and an input device 224, all of which may communicate with one another by way of a communication bus. In various embodiments, components such as the display 202 and/or input device 224 may be integrated into the event signal processing component 112, or they may be external components that are coupled to the event signal processing component 112.

The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device, such as a keyboard, mouse, digital pen, etc. In some embodiments, the event signal processing component 112 may include more (or fewer) components than those shown in FIG. 2A.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the event signal processing component 112. The memory 210 may further include computer program instructions and other information for implementing aspects of the present disclosure. For example, in one embodiment, the memory 210 includes one or more vectorization components 216 processing inputs signals and generating one or more processing vectors characterizing the input signals. The vectorization components 216 may generally perform additional processing of input signals, including, but not limited to, normalizing input signals, classifying the input signals, supplementing the input signals, and the like. Further, the vectorization components 216 may vectorize the input signals by selecting appropriate embeddings. The memory 210 further includes one or more clustering components 218 for processing input signal vectors and grouping related information, such as by network environment, threat profiles, and the like. The clustering components 218 may perform input signal comparison and selection, create a run-time vector database for comparison of different input signals, and then group (e.g., cluster) input signals with a certain threshold of similarity to each other. Additionally, the memory 210 includes at least one emulation component 220 for supplementing or enhancing the processed input vectors for specific functions. The memory further includes a processing component 222 for utilization in threat assessment or mitigation techniques as described herein.

Figure 2B:
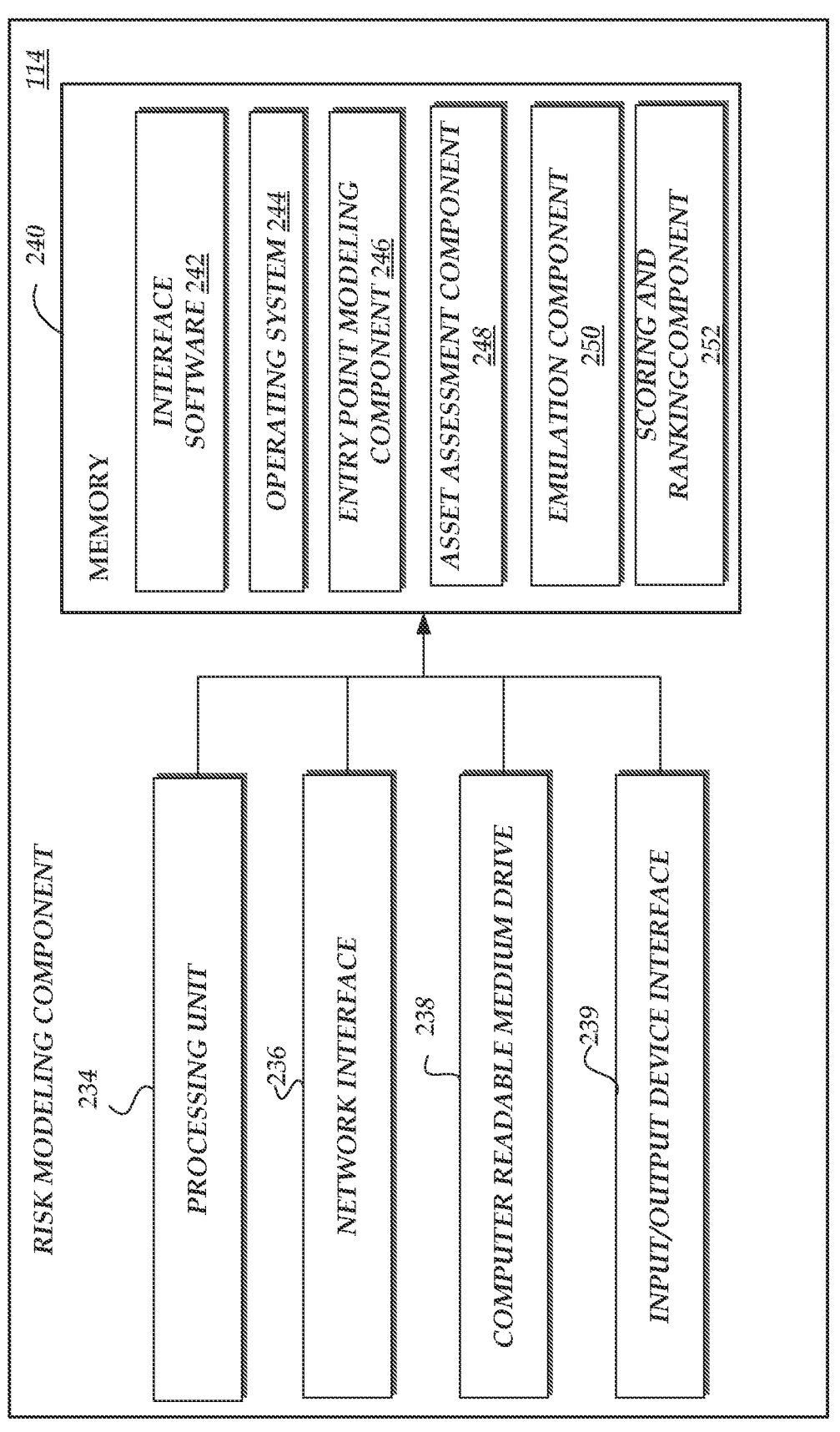
FIG. 2B depicts one embodiment of an architecture of risk modeling processing component in accordance with one or more aspects of the present application.

FIG. 2B depicts one embodiment of an architecture of risk modeling processing component 114. The general architecture of the risk modeling processing component 114 depicted in FIG. 2B includes an arrangement of computer hardware and software components that may be used to implement aspects of the present disclosure. As illustrated, the risk modeling processing component 114 includes a processing unit 234, a network interface 236, a computer readable medium drive 238, an input/output device interface 239, an optional display 232, and an input device, all of which may communicate with one another by way of a communication bus. In various embodiments, components such as the display and/or the input device may be integrated into the risk modeling processing component 114, or they may be external components that are coupled to the risk modeling processing component 114.

The network interface 236 may provide connectivity to one or more networks or computing systems, such as the network 106 of FIG. 1. The processing unit 234 may thus receive information and instructions from other computing systems or services via a network. The processing unit 234 may also communicate to and from memory 240 and further provide output information for an optional display via the input/output device interface. The input/output device interface 239 may also accept input from the optional input device, such as a keyboard, mouse, digital pen, etc. In some embodiments, the risk modeling processing component 114 may include more (or fewer) components than those shown in FIG. 2B.

The memory 240 may include computer program instructions that the processing unit 234 executes in order to implement one or more embodiments. The memory 240 generally includes RAM, ROM, or other persistent or non-transitory memory. The memory 240 may store an operating system 244 that provides computer program instructions for use by the processing unit 234 in the general administration and operation of the risk modeling processing component 114. The memory 240 may further include computer program instructions and other information for implementing aspects of the present disclosure. For example, in one embodiment, the memory 240 includes one or more entry point modeling component 246 for modeling entry points of attack as described herein. The memory 240 further includes high value asset modeling component 248 for characterizing asset values based on impact to one or more network environments as described herein. The memory 240 further includes one emulation components 250 for utilizing modeled assets and threat attacks to identify potential attack patterns and steps as described herein. Additionally, the memory 240 includes at least one scoring and ranking component 252 for generating processing results related to the modeled and emulated attack paths as described herein.

Figure 2C:
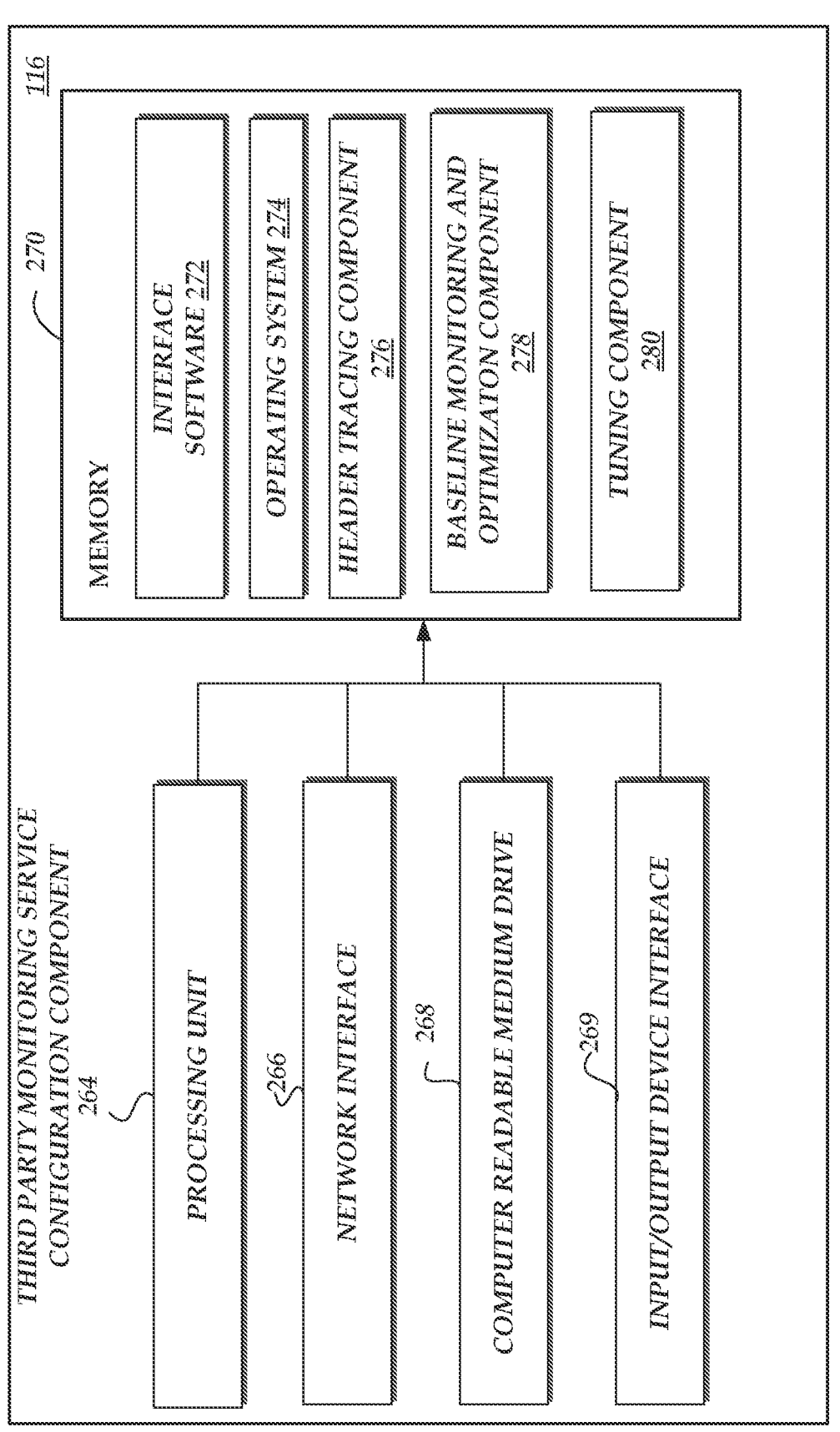
FIG. 2C depicts one embodiment of an architecture of third-party monitoring services configuration component in accordance with one or more aspects of the present application.

FIG. 2C depicts one embodiment of an architecture of third-party monitoring services configuration component 116. The general architecture of the third-party monitoring services configuration component 116 depicted in FIG. 2C includes an arrangement of computer hardware and software components that may be used to implement aspects of the present disclosure. As illustrated, the third-party monitoring services configuration component 116 includes a processing unit 264, a network interface 266, a computer readable medium drive 268, an input/output device interface 269, an optional display 262, and an input device, all of which may communicate with one another by way of a communication bus. In various embodiments, components such as the display and/or the input device may be integrated into the third-party monitoring services configuration component 116 or they may be external components that are coupled to the third-party monitoring services configuration component 116.

The network interface 266 may provide connectivity to one or more networks or computing systems, such as the network 106 of FIG. 1. The processing unit 264 may thus receive information and instructions from other computing systems or services via a network. The processing unit 264 may also communicate to and from memory 270 and further provide output information for an optional display via the input/output device interface. The input/output device interface 269 may also accept input from the optional input device, such as a keyboard, mouse, digital pen, etc. In some embodiments, the third-party monitoring services configuration component 116 may include more (or fewer) components than those shown in FIG. 2C.

The memory 270 may include computer program instructions that the processing unit 264 executes in order to implement one or more embodiments. The memory 270 generally includes RAM, ROM, or other persistent or non-transitory memory. The memory 270 may store an operating system 274 that provides computer program instructions for use by the processing unit 264 in the general administration and operation of the third-party monitoring services configuration component 116. The memory 270 may further include computer program instructions and other information for implementing aspects of the present disclosure. For example, in one embodiment, the memory 270 includes one or more dynamic header tracing components 276 for processing inputs signals from the third-party data sources as described herein. The memory 270 further includes baseline monitoring and optimization components 278 for processing inputs signals and resulting processing results for one or more functions as described herein. The memory 270 further includes one or more tuning components 280 for dynamic optimization of configuration rules for third-party data resources 108 based on performance and needs of risk modeling and threat assessment services.

Figure 2D:
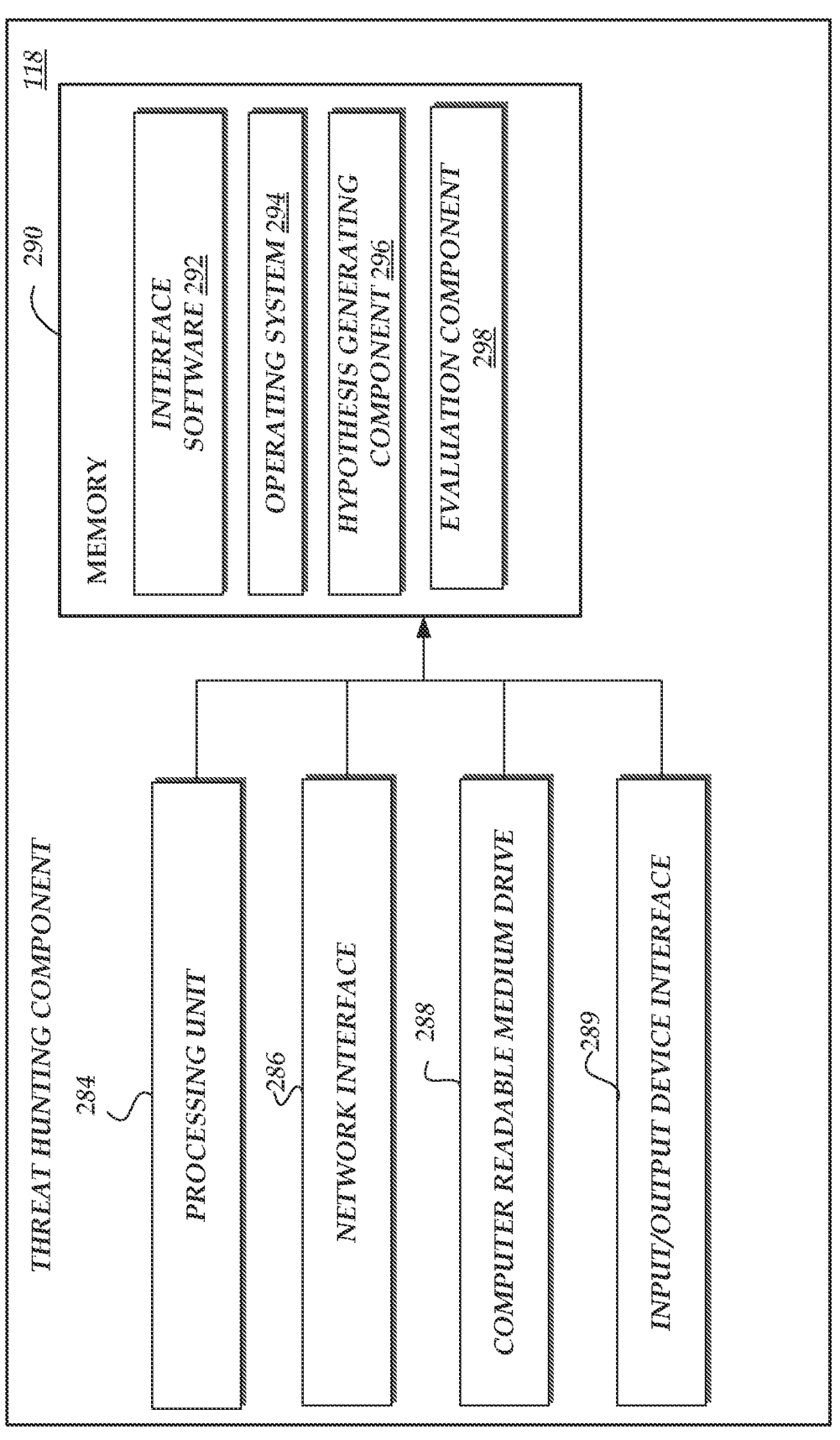
FIG. 2D depicts one embodiment of an architecture of a threat hunting processing component.

FIG. 2D depicts one embodiment of an architecture of a threat hunting processing component 118. The general architecture of the threat hunting processing component 118 depicted in FIG. 2D includes an arrangement of computer hardware and software components that may be used to implement aspects of the present disclosure. As illustrated, the threat hunting processing component 118 includes a processing unit 284, a network interface 286, a computer readable medium drive 288, an input/output device interface 289, an optional display 282, and an input device, all of which may communicate with one another by way of a communication bus. In various embodiments, components such as the display and/or the input device may be integrated into the threat hunting processing component 118 or they may be external components that are coupled to the threat hunting processing component 118.

The network interface 286 may provide connectivity to one or more networks or computing systems, such as the network 106 of FIG. 1. The processing unit 284 may thus receive information and instructions from other computing systems or services via a network. The processing unit 284 may also communicate to and from memory 290 and further provide output information for an optional display via the input/output device interface. The input/output device interface 289 may also accept input from the optional input device, such as a keyboard, mouse, digital pen, etc. In some embodiments, the threat hunting processing component 118 may include more (or fewer) components than those shown in FIG. 2D.

The memory 290 may include computer program instructions that the processing unit 284 executes in order to implement one or more embodiments. The memory 290 generally includes RAM, ROM, or other persistent or non-transitory memory. The memory 290 may store an operating system 294 that provides computer program instructions for use by the processing unit 284 in the general administration and operation of the threat hunting processing component 118. The memory 290 may further include computer program instructions and other information for implementing aspects of the present disclosure. For example, in one embodiment, the memory 290 includes one or more hypothesis generating components 296 for generating one or more security assessment hypothesis based on modeled network threats as described herein. The memory 290 further includes one or more hypothesis evaluation and mitigation components 298 for assessing and prioritizing hypothesis and identifying potential mitigation techniques.

By way of illustration, reference to the above components and the system in general refers to machine learning algorithms or machine-learned algorithms. By way of non-limiting examples, the machine learning algorithms can incorporate different learning models, including, but not limited to, a supervised learning model, an unsupervised learning model, a reinforcement learning model or a featured learning model. Depending on the type of learning model adopted by the machine learning algorithm, the configuration for processing input signals data may vary (e.g., using a training set for a supervised or semi-supervised learning model) may vary. Additionally, different processing results, such as vectorized data, clustering, etc. will be more conducive to other types of machine-learned algorithms. In other embodiments, the machine learning algorithm can implement a reinforcement-based learning model that implements a penalty/reward model determined by a network service (e.g., an offline process). Accordingly, reference to machine-learning algorithms (not optimized) or machine learned algorithms (at least partially optimized) is not intended to reference any particular type of algorithm, training methodology (if applicable) or specific configuration.

Turning now to FIGS. 3A-3D, illustrative interactions of the components of the system 100 will be described. For purposes of the present application, it is assumed that the client computing devices 102, analyst computing devices 104, third-party service providers 108 and the network service 110 have established the necessary interactions and authentications to interact. Accordingly, reference to such interactions will omit some preliminary or intermediary interactions that may be otherwise required.

Figure 3A:
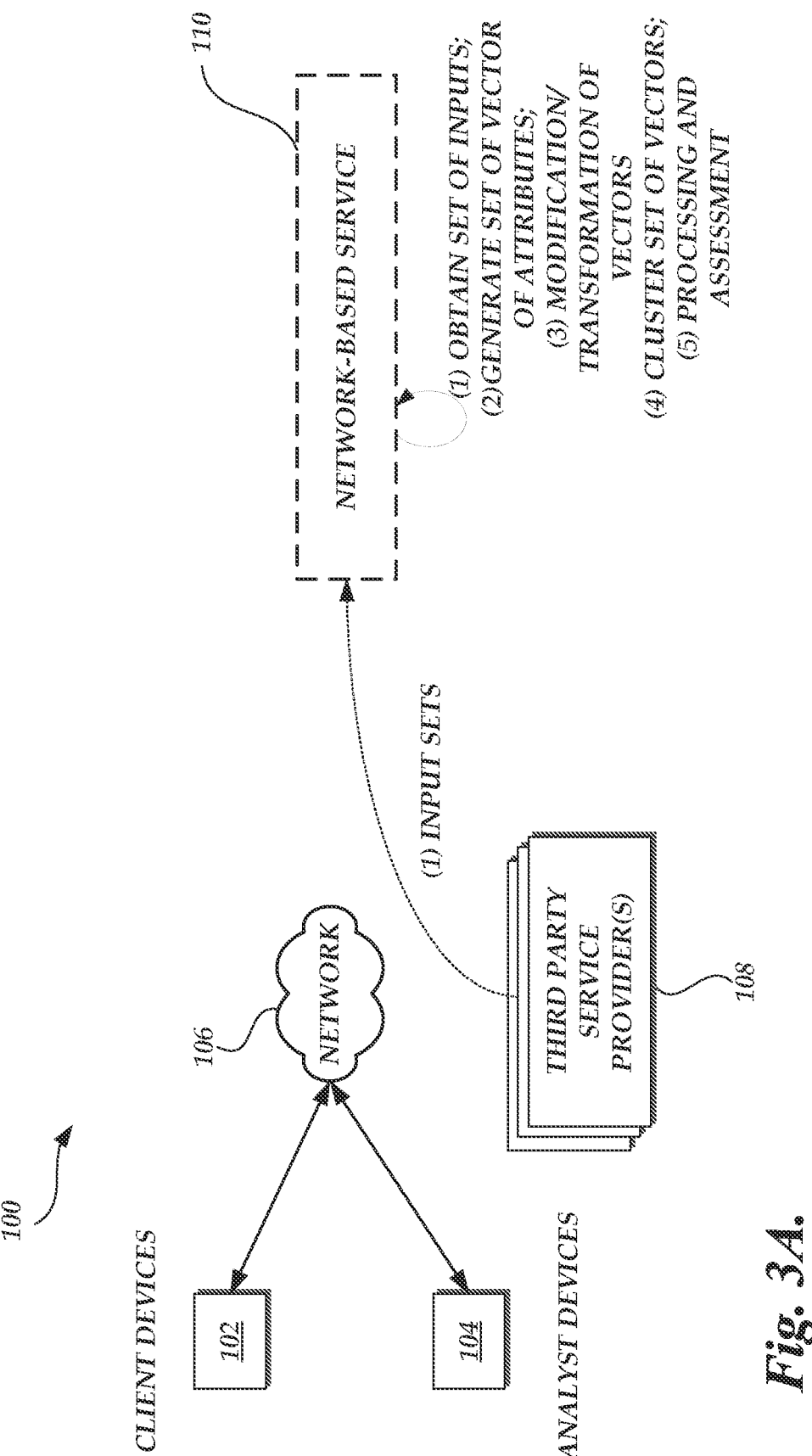
FIG. 3A is a block diagram of the network environment of FIG. 1 illustrating various interactions to process a set of inputs signals to generate processing results for various functionality described in accordance with one or more aspects of the present application.

With reference to FIG. 3A, in one aspect, the event signal processing component 112 may be implemented to process a set of inputs signals to generate processing results for various functionality described. At (1), network service 110 architecture obtains a set of inputs from one or more third-party service providers 108. As stated herein, the input signals may be either inline input signals (e.g., real time-based information) of offline input signals (e.g., information regarding trends or patterns over time). The input signals may be correlated into a common data repository or set of repositories and can correspond to tiered or processed data provided by multiple third-party service providers. For example, input signals can correspond to log files, performance metrics, alarms, notifications, memory contents, and the like. As will be described in detail below, one or more aspects of the present application can correspond to feedback or configuration of the input signals by the network service 110.

At (2), the network service 110 generates processing results from the input signals that correspond to vectorized data. Illustratively, the vectorized data can correspond to various types of vectored data based on potential needs where an input signal may be determined to have a similarity to other input signals in a datastore (e.g., database, etc.). Examples of the types of vectorized data can include location attribute data, type data, machine data, identification data, and the like. Illustratively, the vectorized data may be provided for further processing as described herein or directly to customers.

At (3), the attributes of the input signals may be utilized to create vectorized data. For example, the event signal processing component 112 when receiving an input signal, may normalize the input signal such that it is in the same or similar format to other input signals already processed. Moreover, the event signal processing component 112 may classify and enrich an input signal after normalization. For example, the event signal processing component 112 may classify the input signal to determine its meaning or indication where the signal's attributes are enriched using information from a policy or entity graph, such as entity department details of a user or location information of an internet protocol (IP) address (e.g., enrichment enhances the understanding of the signal's context and facilitates its subsequent classification). The event signal processing component 112 may vectorize the input signal after enrichment. Moreover, the enrichment can include noise/false positive probability, time series analysis from circuit breakers and the like. In another example, the network service can modify by verification of the appropriateness of the data for processing and contextualizing the data relative to other input source data. This can include comparison of various inputs sources to determine the appropriate set of input sources data across multiple data sources.

The event signal processing component 112 may vectorize the input signal input after enrichment. For example, the event signal processing component 112 may vectorize the input signal by selecting appropriate embeddings based on the enriched input signal attributes. For instance, the event signal processing component 112 may identify relationships through graph embeddings (e.g., of the input signal information that may be used in graph embeddings), while text-based attributes (e.g., of the input signals) may be captured using Language Model (LLM) embeddings using an LLM model associated with the event signal processing component 112. The event signal processing component 112 may use this vectorized representation to facilitate the computation of input signal similarity in both the inline input signals and the offline input signals.

At (4), the vectorized data can be further processed using clustering. In other words, the event signal processing component 112 may process the vectorized data to enrich, transform or modify the results. The event signal processing component 112 may cluster either the inline input signal or the offline input signal.

At (5), resulting clusters of alerts can then be sorted and scored, such as using a curve fitting algorithm, illustratively without having to configure rules. In some embodiments, the sorting and scoring of clusters can include threat scores related to a characterization of the likelihood that an identified threat will occur, impact scores related to a characterization that individual, identified threats will cause a disruption or failure in a network environment and confidence score related to the corresponding calculated threat score and impact score. Illustratively, likelihood characterizations can be based on historical data, known attack patterns and other relevant factors. Impact can be a characterization of potential consequences or damage that an event might cause to an organization or targeted systems. Confidence can be levels of certain or trustworthiness of the data or detection mechanisms that were used in the generation of the processing results. In some embodiments, the network service can apply filtering and threshold for the generated scores for purposes of prioritization, notification and alert processing. Additional further processing will be described with regard to other interactions. For example, an incoming vector to an existing cluster is done with at least one stage of similarity search and potentially more stages of pattern matching with existing patterns, vectorized in different database. Illustratively, scores can be associated with ranges or sub-ranges, such as 0-100.

The event signal processing component 112 may also vectorize the inline input signal by performing input signal comparison and selection, creating a run-time vector database, and grouping (e.g., clustering) the input signal together with other input signals based on commonalities or similarities. The event signal processing component 112 may perform signal comparison and selection by using parameters derived from inline input signal attributes, classification information, and enriched context. The event signal processing component 112 may utilize attributes such as, but is not limited to, signal type, attributes, environment, and objectives derived from configurations; to select the appropriate set of signals or situations (i.e., already clustered signals) for comparison, factoring in these parameters (e.g., signal type, attributes, environment, and objectives derived from configurations). Moreover, the event signal processing component 112 may create a run-time vector database by using the selected set of signals or situations identified by the event signal processing component 112 as input.

Furthermore, the event signal processing component 112 may utilize the created run-time vector database to cluster the inline input signals with other input signals. For example, the event signal processing component 112 may determine that the inline input signal exhibits a high similarity to an existing cluster, and then determine whether it should be added to that cluster. Additionally, or alternatively, the event signal processing component 112 may cluster beyond similarity matching including clustering information about associated tickets in a customer's ITSM or similar systems (e.g., cluster together IT service tickets based on which customer created those tickets, or cluster together certain types of tickets, etc.). For example, based on an entity policy, the event signal processing component 112 may only add the inline input signal to clusters associated with open tickets, ensuring that clustering respects organizational constraints and requirements.

The event signal processing component 112 may also cluster the offline input signal. The event signal processing component 112 may cluster the offline input component by scheduling execution of the clustering, performing data management on the input signal, and performing clustering analysis on the input signal to cluster the offline input signal with other input signals. The event signal processing component 112 may schedule the execution of clustering by using a graph of nodes, with each node representing a clustering engine (e.g., the event signal processing component 112 takes input signal data, performs clustering, and send results downstream for further processing one node at a time in a certain order). The event signal processing component 112 may perform data management on the input signal by determining that an unprocessed offline input signal requires clustering along with other un-clustered offline input signals (e.g., this can involve processing large volumes of un-clustered offline input data signals over extended periods). The event signal processing component 112 may perform incremental clustering of new offline input signals based on previous computations or processing of other offline input signals. Moreover, the event signal processing component 112 may perform analysis on the offline input signal by partition elements of the offline input signal based on dimensions derived from user-defined correlation policies (e.g., dimensions being the data points which the offline input signal should be found in similarity or in correlation with other offline input signals).

The event signal processing component 112 may create offline input signal correlation engines in a graph structure, with the indegree of nodes (e.g., clustering engines) at each level determined by data volume of groups of offline input signals to cluster. For example, the event signal processing component 112 may determine that the offline input signal can belong to multiple clusters, retaining inline clustering details associated with customer ticketing systems. The event signal processing component 112 may determine that a final node's results and metadata should store for incremental processing in the future.

Figure 3B:
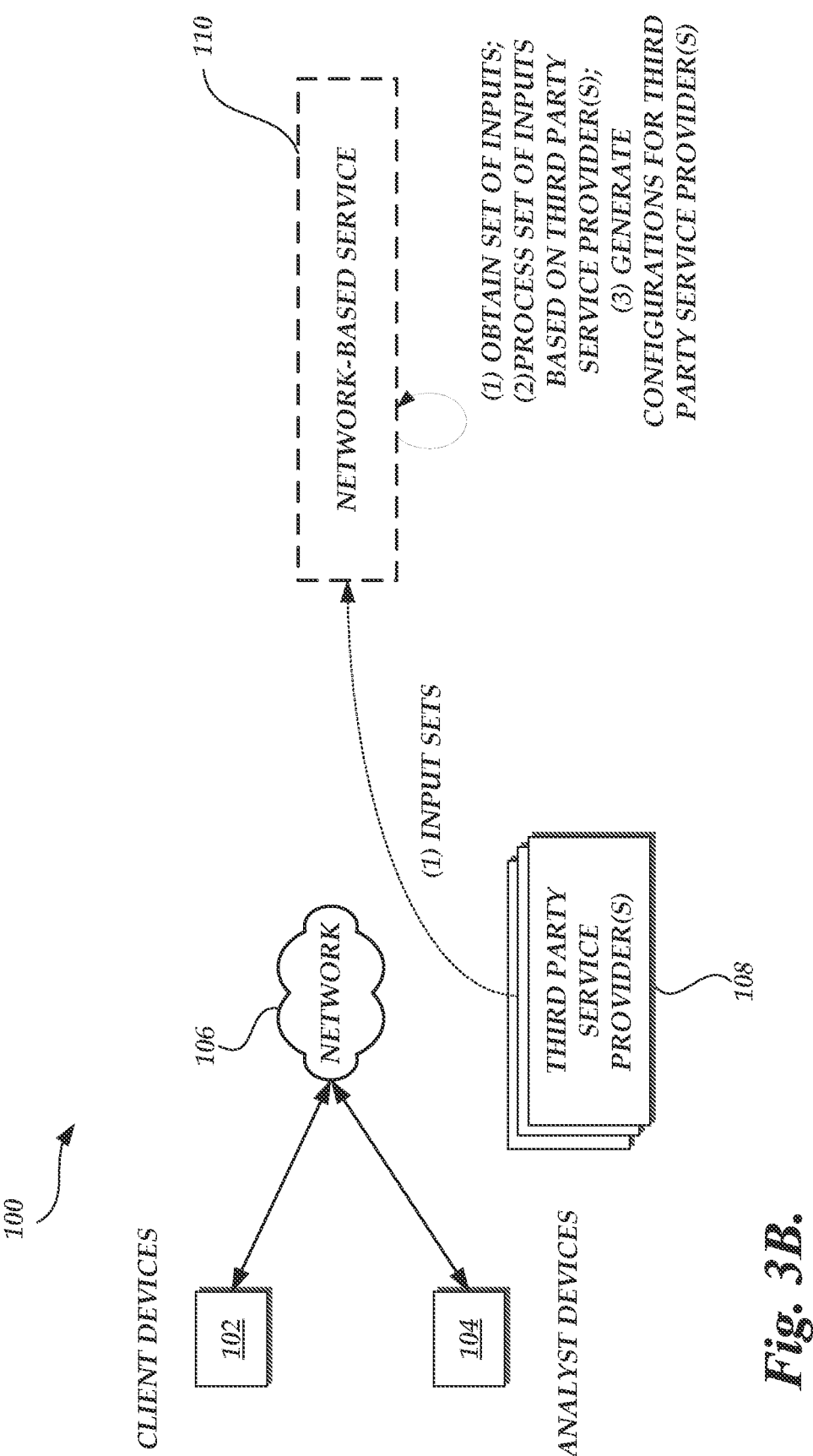
FIG. 3B is a block diagram of the network environment of FIG. 1 illustrating various interactions related to machine-learning-based architecture to continuously fine tunes and configures network monitoring and collection systems in accordance with one or more aspects of the present application.

With reference to FIG. 3B, in accordance with aspects of the present application, the machine-learning-based architecture can include functionality that continuously fine tunes and configures network monitoring and collection systems. At (1), the network service obtains the set of input signals from the third-party service provider(s) 108. The types of information and sources of information previously discussed illustratively apply, at least in part, with this approach. At (2), the network service provider 110 processes the set of inputs. In one aspect, the network service 110 can conduct an analysis of dynamic header tracing to discover and manage service dependencies and maps. In another aspect, the network service can build and score impact graphs based on traces (above) and attack paths generated from previous processing results. The processing can further include utilization of the asset classifications and conformance to the category templates. For example, category templates can correspond to the identification of specification of the configurations, processing capabilities, formatting, etc. for different third-party service providers 108. Accordingly, processing of the set of inputs may be independent service providers 108 in some embodiments, dependent of service providers 108 in other embodiments, or a combination thereof in yet other embodiments.

At (3), the network service then generates configuration information based on the processed data. Processing results can include the configuration or updates of configuration information. In some embodiments, the processing results can correspond to the configuration of new data sources or modification of existing data sources. For example, the processing results can include the correction of missing data fields or information or supplementation of such missing data fields or information. Illustratively, the network service can derive configuration data based on observation of multiple data sources, to identify information gaps. This can include classifying observed entities into high-level categories, maintaining and updating log type information and comparing to determine gaps. The resulting triggers can include recommended actions, including user-based approvals or automated correction.

Figure 3C:
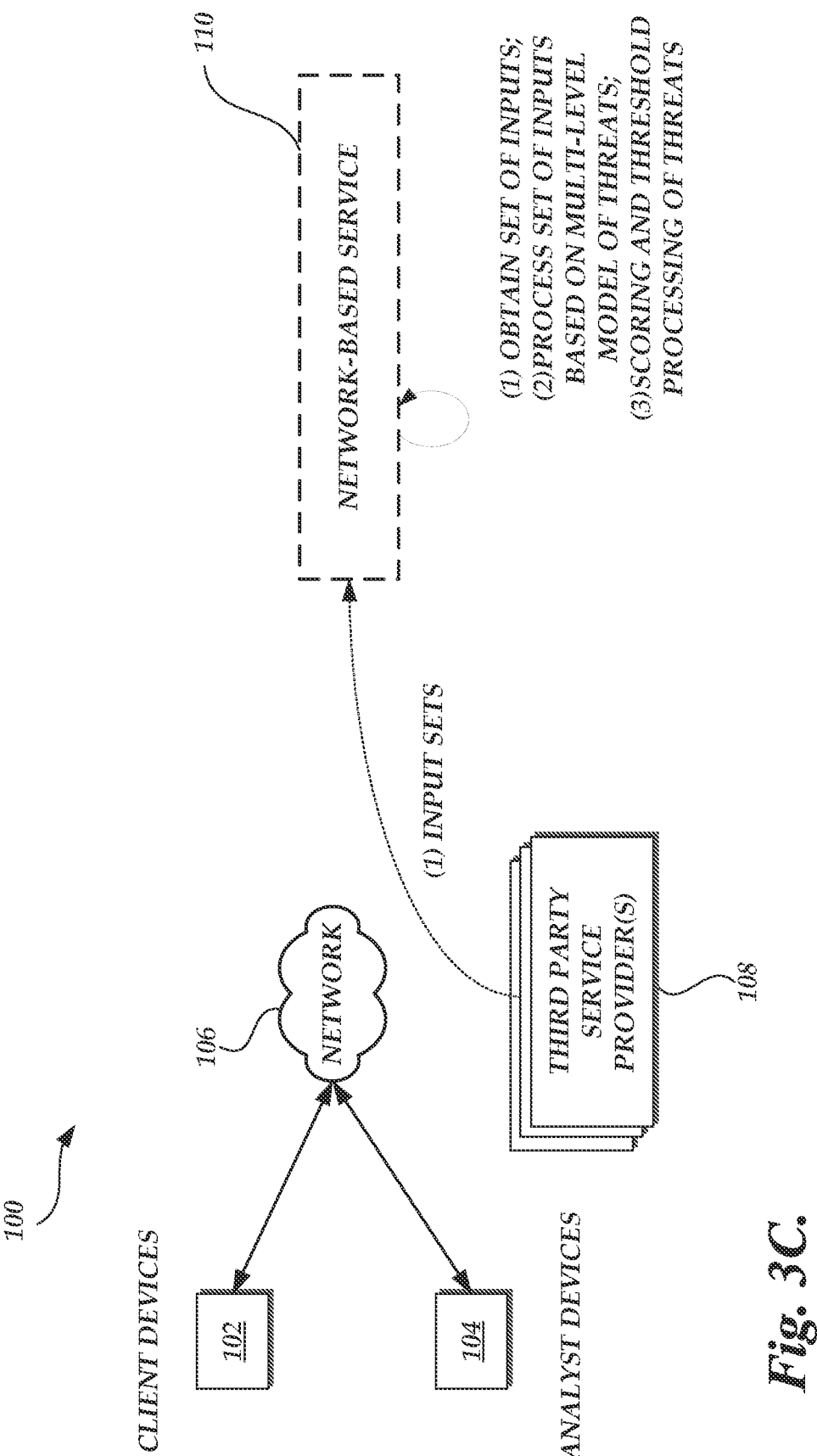
FIG. 3C is a block diagram of the network environment of FIG. 1 illustrating various interactions to automate risk modeling in accordance with one or more aspects of the present application.

With reference to FIG. 3C, in accordance with still further aspects of the present application, the network service 110 can implement a multi-level approach to automating risk modeling via the risk modeling processing component 114. This aspect of the present application may be implemented in combination with one or more other aspects of the present application or implement independently of other aspects. At (1), the network service 110 obtains a set of input signals. Illustratively, the network service 110 can obtain inputs from one or more third-party service providers 108 in a similar manner previously described. At (2), the network service 110 processes the set of input and generates a multi-level model of one or more target network environments. Illustratively, the network service 110 implements a multi-level approach that includes a modeling of entry points of attackers for a network environment. The entry points can illustratively include information based on identifiable entities (e.g., people and identities) and information based on infrastructure and digital asset. For example, the network service 110 may identify entry points by performing an in-depth analysis of the occurrence times of various input signals within a cluster. The network service 110 may perform this analysis of occurrence times to: (1) use time series motif detection to recognize patterns and seasonality in the input signals; (2) use information from the classification of input signals to discern whether the nature of the issue is becoming more severe over time or otherwise (e.g., a series of relatively less severe disk issues may propagate into a VM or application failure); (3) identify and examining repetitions of failures from the same entity or data source; (4) in cases of repeated failures from the same data source, confidence analysis of the log or event source is conducted to determine potential faults in the monitoring system; and (5) determining cluster type which should indicate the nature of the problem or threat that the correlated signals are pointing to. Illustratively, the network service 110 can implement one or more machine-learned algorithms to generate the models based on selection of different inputs to the machine-learned algorithm. These inputs can be refined and updated as part of the configuration of the set of input signals or configuration of the service-providers.

The multi-level approach implemented by the network service 100 can further include modeling of high value assets which are targets for the attackers. As previously described, a characterization of value (e.g., high value, low value, etc.) can be based on characterization of the likely impact to the network environment based on a successful attack/disruption. The network service 110 can implement one or more machine-learned algorithms that can utilize a set of inputs that can process information about the target network environment and make the resulting characterizations for purpose of one or more aspects of the present application. The network service 110 can also incorporate threat intelligence gathered across industry domains for the purpose of one or more aspects of the present application.

The multi-level approach can further include emulation of the modeled adversary behavior to determine the attack paths to targets within the architecture. Illustratively, the modeled attack paths correspond to a combination of the modeled entry points and value targets, such as entities including users, machines, certificates etc. that are part of the attack path. Some of these entities will be marked as critical based on its blast-radius using graph analytics algorithms, e.g., high value targets. The modeled attack paths can also identify potential additional or dependent steps that would need to be completed to complete the attack or otherwise escalate the severity of the attack. For example, the processing results from machine-learned algorithms can identify key future steps or vulnerabilities that may contribute to the mitigation techniques identified by the network service 110.

Still at (2), the network service 110 may utilize one or more of the above determined entry points, asset assessments, or emulation of modelled adversary behavior, to determine a potential threat or attack. For example, the network service 110 may, using at least the determined entry points/asset assessments/emulation, determine an attack or threat by identifying: (1) an occurrence time of the received input signals; (2) associated adversary trajectory of the input signals; (3) network communications associated with the input signals; (4) MITRE Adversarial Tactics, Techniques, and Common Knowledge (ATT&CK) propagation (MITRE Framework) at least as they relate to the input signals; (5) determined impacted entities and persons associated with the input signals; and (6) source of the input signals. Moreover, the network service 110 may, using at least the determined entry points/asset assessments/emulation, determine an attack or threat by generating or utilizing a directed graph data structure where each node of the directed graph data structure (also known as "attack graph") may indicate a technique of the MITRE Framework, where several input signals may correlate to a single node. Furthermore, the network service 110 may determine attack paths of the threat or attack by extracting directed minimum spanning trees with single entry points targeting one or more entities from the directed graph data structure. The network service 110 may determine attacks or threats using the attack graph by: (1) collating all attack paths into the attack graph; (2) identifying new or existing entry points using graph analytics techniques (e.g., centrality concepts, in-degree concepts, etc.); (3) adding input signals to the attack graph indicating exposures to the corresponding attack graph/node where an exposure was detected for an entity; (4) identifying unique targets (e.g., targets of the threat or attack) by extracting them from graph nodes of the attack node with an out-degree of 0 such that impact analysis is automatically initiated and completed by the network service 110 analyzing one or more factors (e.g., number of attack paths leading to a target—target characteristics, such as being a datastore or containing sensitive data like personally identifiable information (PII)—customer set custom tags in entity attributes, indicating critical infrastructure or identity roles, permissions, and titles—known exposures like vulnerabilities and misconfigurations in attack paths leading to the target—a likelihood of an entity being targeted in recent threat actor campaigns (derived from a separate subsystem or curated database, etc.).

At (3) the illustratively multi-level approach includes scoring the determined threat or attack paths that meet the threshold that may be added as part of the attack graph for the organizations. As previously described, one or more machine-learned algorithm or other algorithmic approaches, such as the incorporation of threat intelligence, to utilize scoring methodologies to generate characterization of likelihood of attack path attacks and potential confidence values related to the generated scores. Scoring information (and associated confidence information) can be used to analyze and determine the current cyber situational awareness, which includes key metrics like least time to compromise, high value targets, etc.

The network service 110 may determine a score for a threat or attack based on at least a likelihood of the threat or attack, impact of the threat or attack, or confidence in the threat or attack. For example, the network service 110 may determine the likelihood of the threat or attack by determining a probability of the threat or attack occurring (e.g., security breach or system failure) and can be based on historical data, known attack patterns, or other relevant factors, etc. In another example, the network service 110 may determine the impact of the threat or attack by measuring the potential consequences or damage that the threat or attack might cause to an organization (e.g., or other entity), its operations, or its reputation. In this example, the network service 110 may determine the impact by analyzing: (1) outcomes from entity classification as high-value assets, chokepoints, and entry points; (2) user-defined custom tagging information on a criticality of the entity or data type (e.g., PII, private financial information, private health information, etc.); (3) natural language processing (NLP) analysis on characters or text associated with an entity indicating at least names and attributes (e.g., such as a department), to infer an entity's value for an organization. In another example, the network service 110 may determine the confidence in the threat or attack by at least analyzing each received input signal and associated clusters for those input signals, where each input signal is compared to similar past input signals using signal similarity search on the vector database. In this example, the network service 110 may utilize unsupervised, supervised, and policy-based techniques to determine the confidence in the threat or attack. Still in this example, the network service 110 may determine the confidence in the threat or attack by taking into account factors such as: (1) relevancy of the input signals based on inputs from supervised training by analysts, indicating signal relevance or irrelevance; (2) prevalence of the input signals based on a time series analysis of past input signals, examining curve shape and seasonality; and (3) detection confidence on the input signals using information from the input signal generation source from either external systems or signal detection models.

Moreover, in addition to impact, confidence, and likelihood, the network service 110 may use other techniques or concepts to score the threat or attack. For example, the network service 110 may generate the score by utilizing or analyzing: (1) risk quantification of entry points; (2) impact analysis of targets and high-value assets (HVAs); (3) the number and exposures of choke points in attack paths; and (4) overlap of attack paths with current, trending, and relevant Tactics, Techniques, and Procedures (TTPs) from a curated database, computing the possibility of these TTPs being active and attributing to threat actors. Further, the network service 110 may generate the score utilizing a scoring system, where the scoring system may be based on categories based on severity (e.g., six categories total with three categories indicating severity levels and three categories indicating the absence of severity). The network service 110 may use the six category scoring system to determine the score of the threat or attack by utilizing a scoring engine program or process that may be scheduled to run as an inverted binary tree where each tree node of that binary tree node represents a scoring engine instance that processes two categories at a time (e.g., and based on a curve-fitting model at least described in https://dl.acm.org/doi/abs/10.5555/2893873.2893943).

Illustratively, the scoring algorithms can be refined based on customer custom polices along with feedback, such as published risk profiles, vulnerability information, social inputs, and the like. For example, the network service 110 may allow organizations create policies to determine which situations (signal clusters) they would like to review and take action on where these policies can incorporate both prioritization and workload management factors (e.g., allowing teams to balance their workloads and focus on the most critical issues). As a first example of a custom policy, a policy may specify that any situation with an impact score greater than 90 and a confidence score above 85 should be reviewed. This may ensure that high-impact situations, such as a CEO receiving a phishing email, are prioritized for review, regardless of the likelihood of occurrence. This may be important during weekdays when a team is fully staffed and can handle more workloads. As a second example of a custom policy, a policy may be set to consider high likelihood scores alongside impact and confidence scores on weekends, assuming that available personnel might be limited during this time. This may help to keep workloads light while still addressing situations that have a high probability of occurrence of an attack or threat. As such, the network service 110 may combine a sophisticated scoring system with flexible, time-bound policies, where organizations (e.g., or other entities or persons) can better manage their workloads and ensure that their teams are focused on addressing the most pressing concerns. The network service 110 implementing a scoring system may allow organizations to respond to evolving threats, prioritize resources effectively, and maintain a high level of security and performance across their operations.

In accordance with still further aspects of the present application, the network service 110 can illustratively integrate the outcomes of the modeling effort for ongoing threat detection and threat hunting processing results. Illustratively, the network service 110 utilizes security threat hypothesis to evaluate and identify security threats. In some embodiments, three different types of threat hunting hypothesis. A first type of threat hypothesis can be based on a current state of the network environment under observation. This type of threat hypothesis can be characterized as reactive. A second type of threat hypothesis can be characterized as proactive threat hunting. The second threat hypothesis type can be based on changes to the risk profile of entry points and published or known vulnerabilities that might impact the modeled network environment. The third type of threat hypothesis type can be based on attack path predictions, that are critical and cross certain thresholds. Accordingly, in some embodiments, the machine-learned-based architecture implements management workflows and data integrations that for the information from threat hunting systems that needs to be recorded in the case management systems.

The resulting processing results generates relevant, prioritized (with evidence) hypothesis. In some embodiment, the processing results can include recommendations for identifying threat indicators or setting up methodologies for detection. The processing results can include improvements to precision and depth of detection, optimizations of existing policies, detection of ineffective rules, creation of new policies, creation of new detection mechanisms, and the like.

Figure 3D:
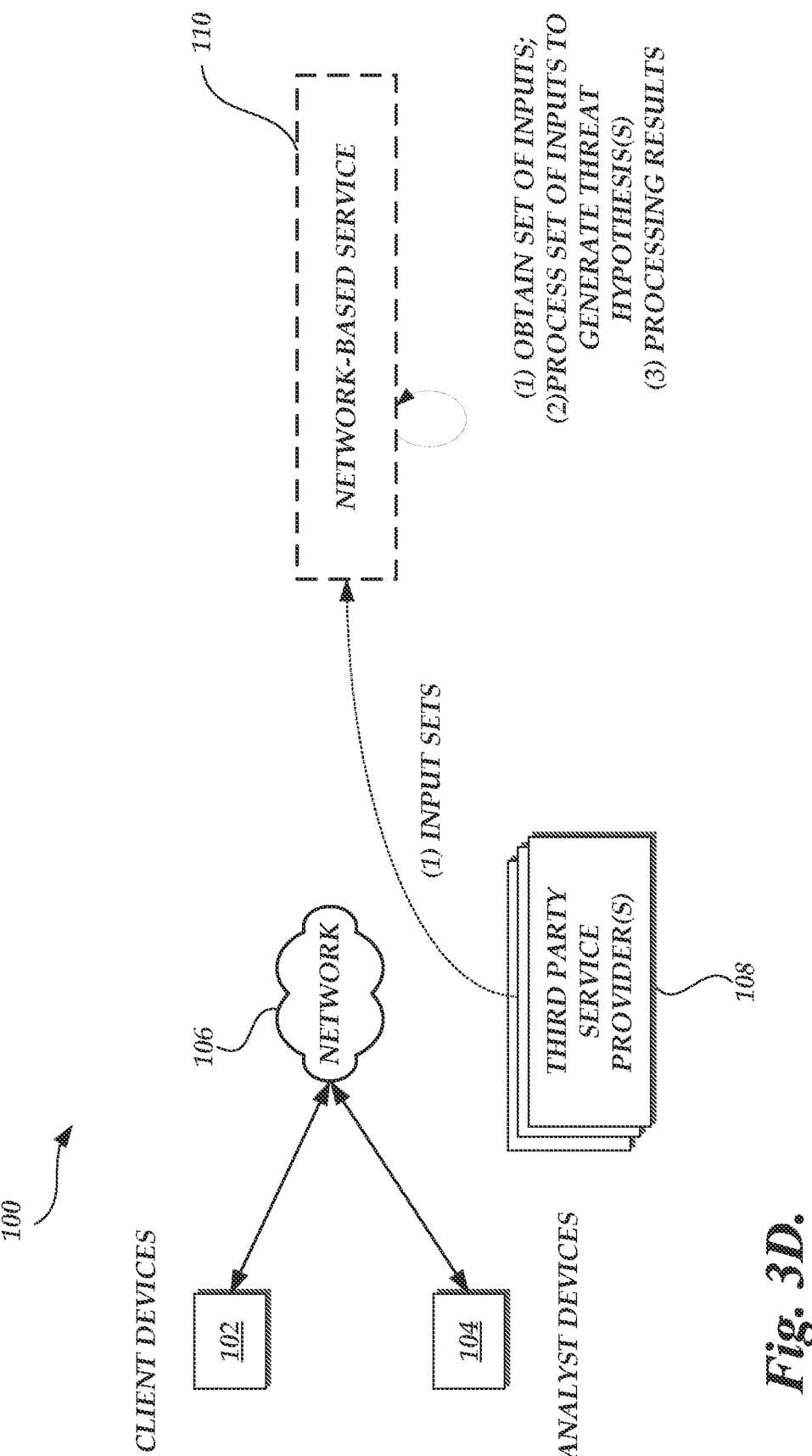
FIG. 3D is a block diagram of the network environment of FIG. 1 illustrating various interactions illustrating modeling effort for ongoing threat detection and threat hunting processing results in accordance with one or more aspects of the present application.

Turning now to FIG. 3D, in accordance with still further aspects of the present application, the network service 110 can illustratively integrate the outcomes of the modeling effort for ongoing threat detection and threat hunting processing results. At (1), the machine-learned-based architecture generates a set of security threat hypothesis(s) to evaluate and identify security threats. In some embodiments, the network service 110 can generate one or more of three different types of threat hunting hypotheses. A first type of threat hypothesis can be based on a current state of the network environment under observation. This type of threat hypothesis can be characterized as reactive. A second type of threat hypothesis can be characterized as proactive threat hunting. The second threat hypothesis type can be based on changes to the risk profile of entry points and published or known vulnerabilities that might impact the modeled network environment. The third type of threat hypothesis type can be based on attack path predictions, that are critical and cross certain thresholds. Illustratively, the results of the three different types of threat hunting hypotheses are processed and in one embodiment, presented to the users in a user interface that enables access to the case management systems. Illustratively, the network service 110 can implement one or more machine learned algorithms that can be configured (e.g., trained) to utilize templates for generating threat hypotheses. Such inputs to these machine-learned algorithms can include network architecture attributes, descriptions, threat models and assessments, external information, and the like.

At (2), the network service 110 implements management workflows and data integrations that for the information from threat hunting systems that needs to be recorded in the case management systems. Illustratively, one or more machine-learned algorithms may be utilized to generate processing results relating to the evaluation of threat hypothesis. For example, the set of inputs to the machine-learned algorithm can correspond to the generated set of hypothesis and additional inputs related to current states, future states, historical states of the network environment. The resulting processing results generates relevant, prioritized (with evidence) hypothesis.

At (3), the processing results can include recommendations for identifying threat indicators or setting up methodologies for detection.

Figure 4:
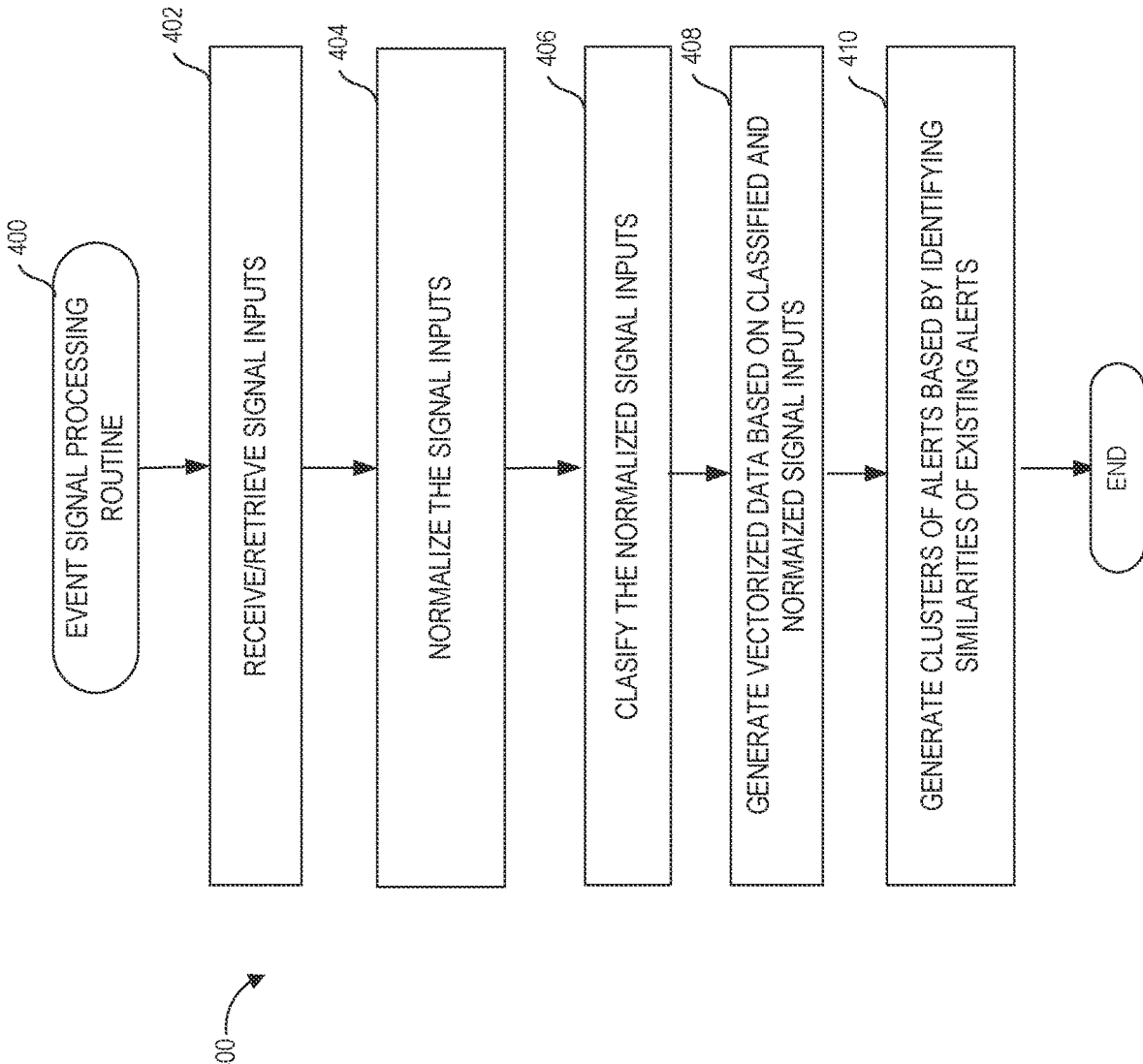
FIG. 4 is a flow diagram illustrative of a routine for event signal processing.

Turning now to FIG. 4, a routine 400 is illustrated for event signal processing.

At block 402, the network service 110 receives or retrieves input signals from third-party service providers. As described herein, the input signals may include information such as indicators pointing to failure of a computing system, threats, attacks, performance issues of computing systems or networks, or other indicator that an entity or person will suffer from an attack or threat to their computing systems or networks. Moreover, the input signals may further include log files, performance metric information, alert data, configuration data, trace data, and the like. Individual third-party providers may include interfaces for receiving configuration information regarding the collection of information, such as processing rules, machine-learned algorithms, content generation systems, or additional settings.

At block 404, the network service 110 normalizes the input signals for processing. As described herein, the network service 110 may normalize an input signal such that it is in the same or similar format to other input signals already processed. Moreover, at block 406, the network service 110 may classify and enrich an input signal after normalization. For example, the event network service 110 may classify the input signal to determine its meaning or indication where the signal's attributes are enriched using information from a policy or entity graph, such as entity department details of a user or location information of an internet protocol (IP) address (e.g., enrichment enhances the understanding of the signal's context and facilitates its subsequent classification).

At block 408, the network service 110 generates vectorized data based on the classified and normalized signal inputs. For example, the network service 110 may vectorize the input signal by selecting appropriate embeddings based on the enriched input signal attributes. For instance, the network service 110 may identify relationships through graph embeddings (e.g., of the input signal information that may be used in graph embeddings), while text-based attributes (e.g., of the input signals) may be captured using Language Model (LLM) embeddings using an LLM model associated with the network service 110. The network service 110 may use this vectorized representation to facilitate the computation of input signal similarity in both the inline input signals and the offline input signals.

At block 410, the network service 110 generates clusters of alerts based on identifying similarities of existing alerts. In other words, the network service 110 may process the vectorized data to enrich, transform or modify the results resulting in grouping of alerts based at least on similarities with other alert clusters.

Figure 5:
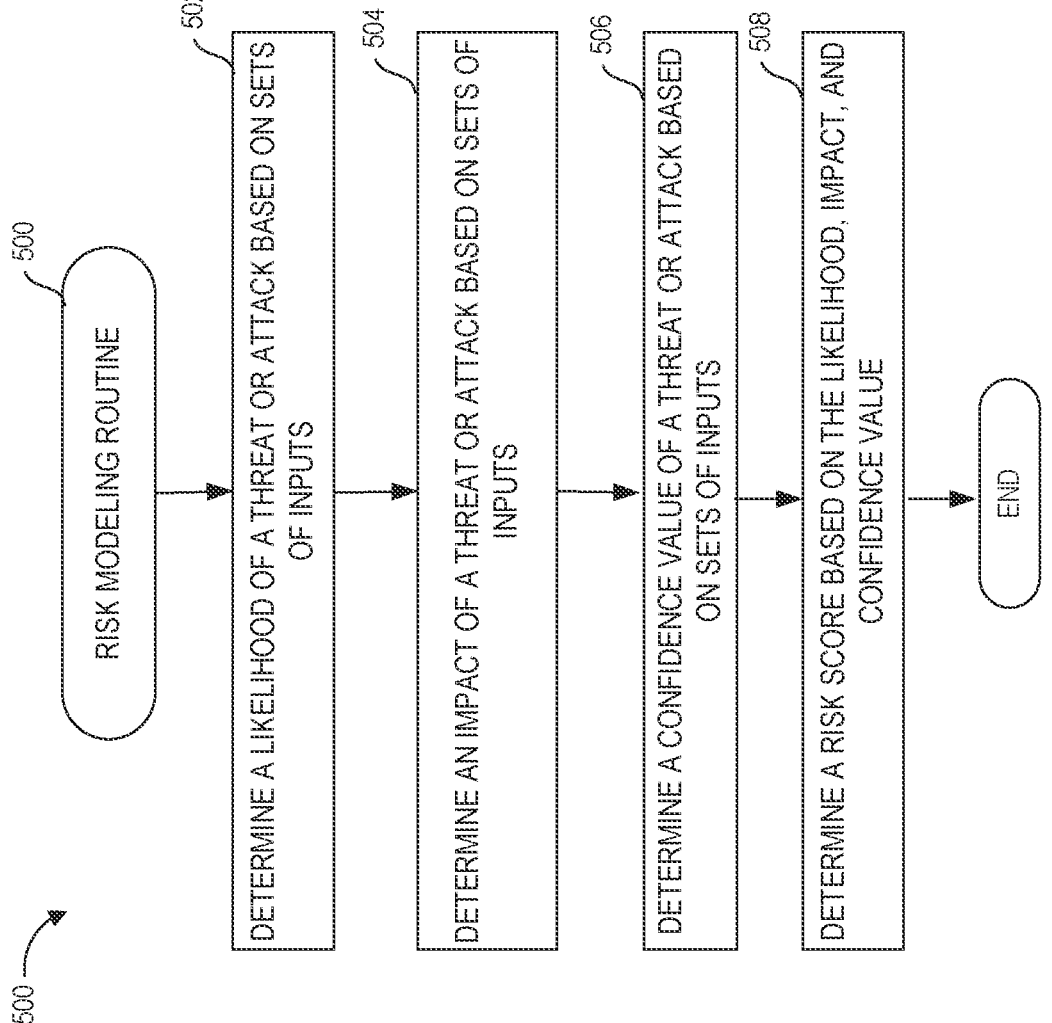
FIG. 5 is a flow diagram illustrative of a routine for risk modeling.

Turning now to FIG. 5, a routine 500 is illustrated for risk modelling.

At block 502, the network service 110 determines a likelihood of a threat or attack based on input signals. As described herein, the network service 110 may determine the likelihood of the threat or attack by determining a probability of the threat or attack occurring (e.g., security breach or system failure) and can be based on historical data, known attack patterns, or other relevant factors, etc. In another example, the network service 110 may determine the impact of the threat or attack by measuring the potential consequences or damage that the threat or attack might cause to an organization (e.g., or other entity), its operations, or its reputation. In this example, the network service 110 may determine the impact by analyzing: (1) outcomes from entity classification as high-value assets, chokepoints, and entry points; (2) user-defined custom tagging information on a criticality of the entity or data type (e.g., PII, private financial information, private health information, etc.); (3) natural language processing (NLP) analysis on characters or text entity indicating at least names and attributes (e.g., such as department), to infer an entity's value for an organization.

At block 504, the network service 110 determines an impact of the threat or attack based on the inputs signals. As described herein, the network service 110 may determine the impact of the threat or attack by measuring the potential consequences or damage that the threat or attack might cause to an organization (e.g., or other entity), its operations, or its reputation. In this example, the network service 110 may determine the impact by analyzing: (1) outcomes from entity classification as high-value assets, chokepoints, and entry points; (2) user-defined custom tagging information on a criticality of the entity or data type (e.g., PII, private financial information, private health information, etc.); (3) natural language processing (NLP) analysis on characters or text entity indicating at least names and attributes (e.g., such as department), to infer an entity's value for an organization.

At block 506, the network service 110 determines a confidence value of the threat or attack based on the input signals. For example, the network service 110 may determine the confidence in the threat or attack by at least analyzing each received input signal and associated clusters for those input signals, where each input signal is compared to similar past input signals using signal similarity search on the vector database. In this example, the network service 110 may utilize unsupervised, supervised, and policy-based techniques to determine the confidence in the threat or attack. Still in this example, the network service 110 may determine the confidence in the threat or attack by taking into account factors such as: (1) relevancy of the input signals based on inputs from supervised training by analysts, indicating signal relevance or irrelevance; (2) prevalence of the input signals based on a time series analysis of past input signals, examining curve shape and seasonality; and (3) detection confidence on the input signals using information from the input signal generation source from either external systems or signal detection model At block 508, the network service 110 determines a risk score based on the likelihood, impact, and confidence of the of the threat or attack. In some embodiments, the risk score can be combined into a singular score. In other embodiments, a risk score can be made up of multiple risk scores (e.g., sub-risk scores) in which policies may be applied as to individual sub-risk scores or a combination risk score. For example, the network service 110 determines a risk score for the likelihood, the impact, and the confidence of the of the threat or attack. As described herein, the total resulting risk score may be influenced by a custom policy of a company where certain factors or values are more important than others. For example, a company may place more emphasis on threats or attacks that may occur on the weekend because their support for defense against threats or attacks are limited during those hours. As another example, another company may place more importance on how high a likelihood of the threat or attack happening is because such company views each threat or attack equally.

Figure 6:
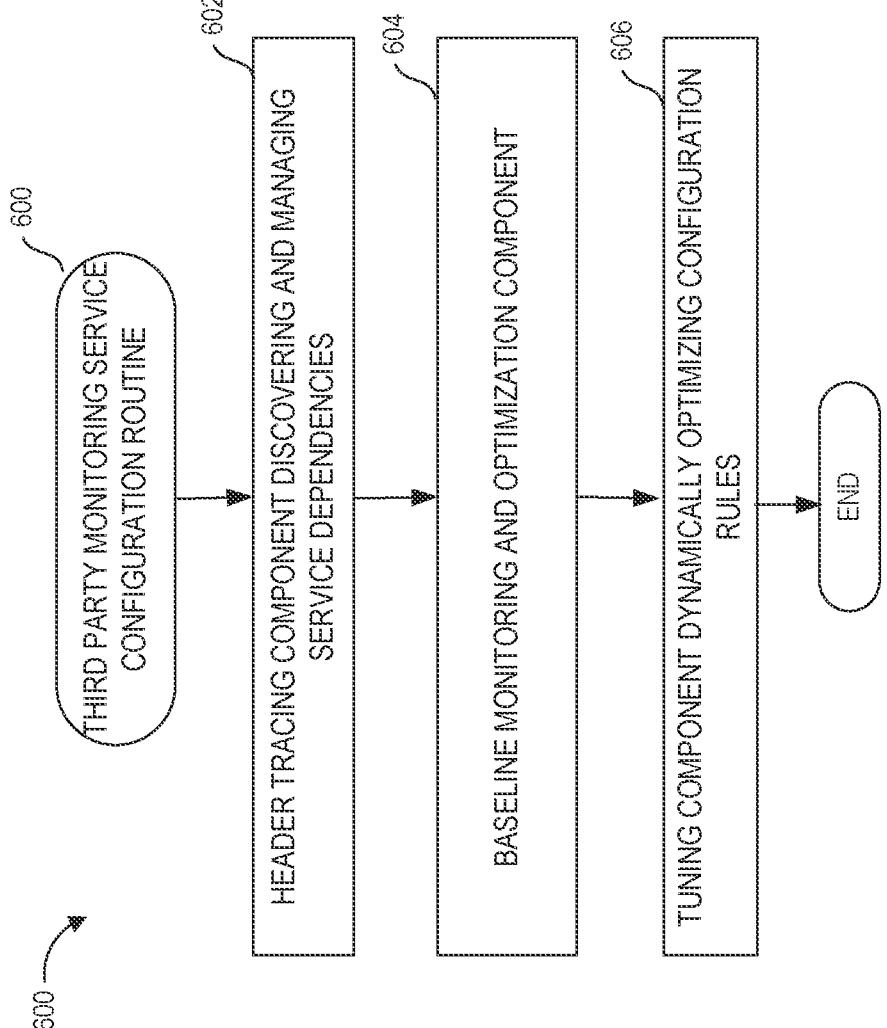
FIG. 6 is a flow diagram illustrative of a routine for a third-party monitoring service.

Turning now to FIG. 6, a routine 600 is illustrated for a third-party monitoring service.

At block 602, the network service 110 uses a header tracing component to discover and manage service dependencies.

At block 604, the network service 110 implements baseline monitoring and optimization. The network service 110 can illustratively identify new content sources based on at least one of analyzing types of data to monitor and examining existing gaps on the third-party monitoring systems. For example, monitoring gaps can be derived by comparing discovered entities by these third party monitoring systems and determining if there is any missing information from those entities.

Illustratively, the third-party monitoring services component is further configured to classify observed entities into high-level categories, such as Databases, based on their characteristics (e.g., MySQL, BigQuery, PostgreSQL classified as Databases).

At block 606, the network service 110 implements dynamic optimization of configuration rules. For example, the third-party monitoring services component can be configured to at least one of maintain and update a database of log types and fields captured by categories, using a combination of expert training and observed configurations. For example, the network service can compare database of log types and fields with observed entities to determine gaps in the monitoring coverage. Additionally, the network service 110 trigger recommended actions based on the determined gaps, wherein the recommended actions, upon user approval, automatically configure new content sources. For example, if a new PaaS solution like RDS in AWS is discovered, it can be added as a content source, and the system can configure the parsers to extract the relevant fields identified in the gap analysis. Still further, the network service can continuously detect the optimal configuration and setup of third-party detection and monitoring tools in cloud environments, taking into account the dynamic changes in infrastructure and budget restrictions.

In accordance with further embodiments, a method to derive intelligence for tool configuration be provided. The network service receives inputs from other subcomponents, such as entity impact analysis and detection coverage, which provide information about risky entry points, chokepoints, and high-value assets (HVAs). Based on the existing detection tools and the available budget, generating recommendations for setting up new tools, configuring parameters, or fine-tuning existing setups to enhance the overall detection and observability capabilities. Examples of outcomes include enabling detailed web application scanning for a risky entry point, recommending the deployment of End-point Detection and Response (EDR) for high-risk employees, collecting metrics and logs from a newly deployed Kubernetes cluster, or selectively turning off certain log sources that do not provide valuable information.

In some embodiments, the network service 110 can be configured to be running continuously to identify gaps in the monitoring and detection configuration, and providing recommendations to the user for approval. Alternatively, if the system is set to automated deployment with a predefined policy (fully adaptive), configuration changes are applied automatically without requiring explicit user approval. Additionally, the network service 110 can update the configuration for the tools. For example, by analyzing the recommendations generated to determine if a new setup or updates to the existing setup are required.

The system can be further configured to handle multiple scenarios for new content source setup. These scenarios include if the setup of a new content source, requires deployment of a collection agent in a container or a Virtual Machine (VM), automating the setup of the VM using native cloud APIs and deploying the application. The scenarios also include configuring deployed applications to collect and send the appropriate logs, utilizing templates based on the recommendations. Still further, the scenarios include if the content source setup needs to be provisioned and set up with just APIs (SaaS or PaaS), enabling pre-existing automation scripts for these content sources on the third party monitoring systems, with the pre stored instruction set and authentication details for establishing connections and accessing relevant information.

Still further, the network service is further configured to perform configuration updates to existing setups, which may involve enabling the collection of specific types of logs or data that were not previously set up, as well as activating certain detection mechanisms within the third party monitoring systems.

Figure 7:
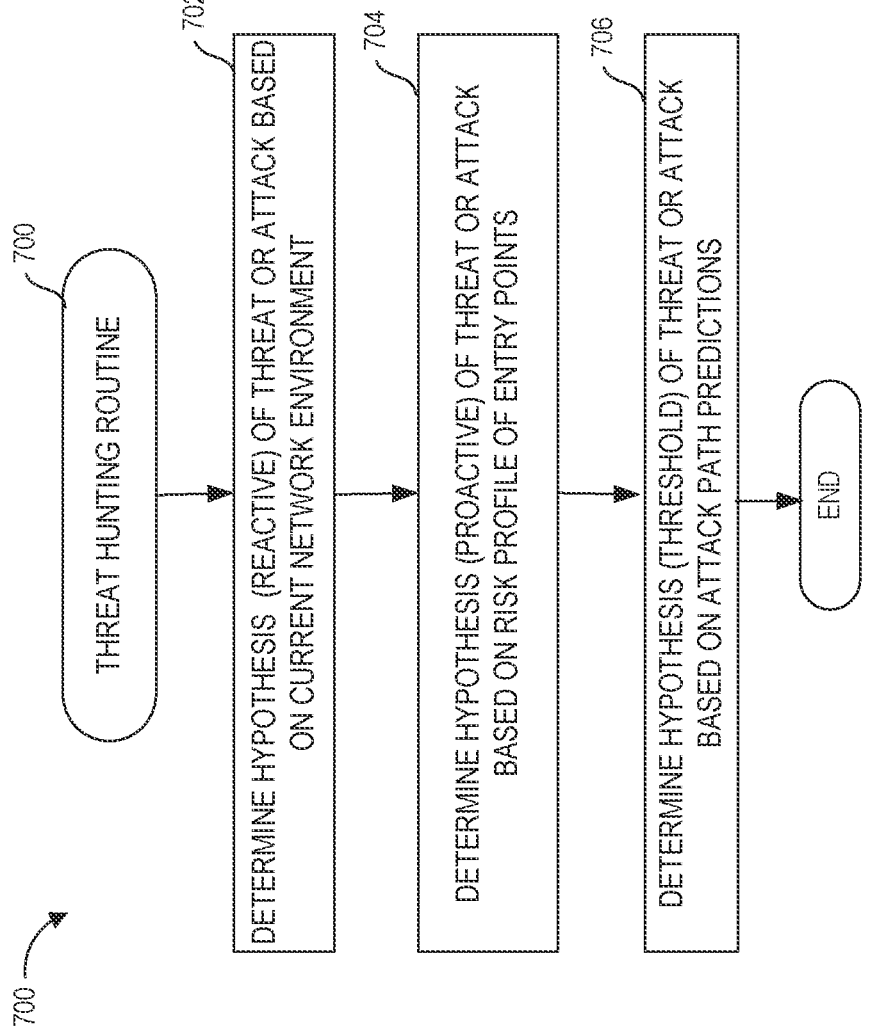
FIG. 7 is a flow diagram illustrative of a routine for threat hunting.

Turning now to FIG. 7, a routine 700 is illustrated for threat hunting. At block 702, the network service 110 determines hypothesis or threat attacks on current network environment. For example, the network service 110 can identify the computer risk as a first computer risk based on the current state of a network environment associated with the observed inputs. The network service 110 can also identify the computer risk as a second computer risk based on changes to the risk profile of entry points and known vulnerabilities of the network environment. These changes impact a modeled network environment derived from the actual network environment. The network service can further identify the computer risk as a third computer risk based on critical attack path predictions that cross a predetermined threshold.

At block 704, the network service 110 determines the threat or attack risk profiles. The network service can prioritize the computer risks against other identified risks based on risk scores from the risk modeling component of the system. The network service can also identify threat hunting hypotheses for each type of risk. The network service can further identify mitigation techniques for the prioritized risks.

At block 706, the network service 110 determines the threat based on attack path. This can include examining the number of attack steps and their position in the attack flow or kill chain; identifying any existing weaknesses in the impacted assets and providing steps to confirm possible exploitation of those weaknesses and gather evidence; measuring the propagation of the attack and providing threat hunting steps for gathering evidence of propagation; and examining the last observed attack step on the target and providing steps for confirming the observed attack and gathering evidence.

In accordance with illustrative embodiments, a self-correcting system for configuring and detecting signals within the monitoring environment to identify system and computer risks is provided. The system is designed to receive inputs from various third-party sources, which can include both streaming data and historical data. The system is further designed to utilize an adaptive configuration and fine-tuning component of the data management configurations to characterize rules and models for detecting computer threats, attacks, performance bottlenecks, availability issues, and other indicators of potential risk for the organization.

Illustratively, the characterization is based on (i) Fill any gaps in detection coverage: The system aims to address any gaps in the detection coverage to ensure comprehensive monitoring and timely identification of potential security threats. This includes identifying areas where the current detection mechanisms may be insufficient and implementing measures to enhance the coverage. By doing so, the system helps minimize the risk of system compromise and data breaches. (ii) Keep the system updated with the latest known Tactics, Techniques, and Procedures (TTPs), techniques, or compliance controls: The system actively incorporates the latest knowledge regarding TTPs, techniques, and compliance controls. By staying up-to-date with the evolving threat landscape, the system enables the organization to proactively defend against emerging threats. This includes keeping track of new attack vectors, zero-day vulnerabilities, and other developments in the cybersecurity landscape, and adjusting the detection rules and models accordingly. (iii) Maintain consistency across multiple tenants: The system ensures consistency in detection policies and mechanisms across multiple tenants. This consistency guarantees that all tenants within the organization receive the same level of protection and can benefit from shared intelligence and best practices. By maintaining a unified approach to detection and leveraging collective knowledge, the system enhances the overall security posture of the organization and promotes effective risk mitigation.

By expressing signal detection models and policies as code, the system provides a standardized and flexible approach for managing configurations. The use of generative AI enhances the efficiency and effectiveness of generating or updating detection policies based on the derived intelligence. Users have the ability to review and approve the recommendations, ensuring transparency and control over the configuration changes before they are deployed. This system enables organizations to efficiently adapt their detection capabilities and stay ahead of emerging threats while maintaining a streamlined and user-friendly configuration management process.

In accordance with an illustrative embodiment, an event signal processing system, method and computer-readable medium are provided in accordance with embodiments of the present application.

Clause 1—A system for identifying computer risk, the system configured to:

receive a set of inputs from a plurality of third-party sources, wherein the set of inputs comprise at least one of streaming data or historical data;

perform, by an event signal processing component of the system, normalization on the set of inputs;

perform, by the event signal processing component of the system, classification of the normalized set of inputs;

generate, by a machine learning model of the event signal processing component of the system, vectorized data based on the normalized and classified set of inputs, wherein the vectorized data indicates at least one of a (i) signal type, (ii) network environment, or (iii) objective; and generate, by the event signal processing component of the system, clusters of alerts based on the vectorized data by identifying a similarity of existing alert clusters.

Clause 2—The system as recited in Clause 1, wherein the set of inputs are at least one of (i) log files, (ii) performance metric information, (iii) alert data, (iv) configuration data, or (v) trace data.

Clause 3—The system as recited in Clause 2, wherein the classification comprises categorizing each set of input, of the set of inputs, wherein each of the normalized set of inputs is categorized as having at least one of a (i) designated department of a user, or (ii) location information of an internet protocol (IP) address.

Clause 4—The system as recited in Clause 3, wherein the classification is based on a policy or entity graph.

Clause 5—The system as recited in Clause 1, wherein normalization of the set of inputs comprises transforming the set of inputs into a uniform format for processing.

Clause 6—The system as recited in Clause 1, wherein the signal processing component, prior to clustering the vectorized data, is further configured to:

embed a graph to represent a relationship of the vectorized data; or embed a large language model (LLM) embedding to represent an attribute of the vectorized data.

Clause 7—The system as recited in Clause 1, wherein the vectorized data is stored in a run-time vector database.

Clause 8—The system as recited in Clause 1, wherein identifying the similarity of existing alert clusters is based at least on one or more correlation rules.

Clause 10—A computer-implemented method comprising:

receiving a set of inputs from a plurality of third-party sources, wherein the set of inputs comprise at least one of streaming data or historical data;

performing normalization on the set of inputs;

performing classification of the normalized set of inputs;

generating, by a machine learning model, vectorized data based on the normalized and classified set of inputs, wherein the vectorized data indicates at least one of a (i) signal type, (ii) network environment, or (iii) objective; and generating clusters of alerts based on the vectorized data by identifying a similarity of existing alert clusters.

Clause 11—The computer-implemented method of Clause 10, wherein the set of inputs are at least one of (i) log files, (ii) performance metric information, (iii) alert data, (iv) configuration data, or (v) trace data.

Clause 12—The computer-implemented method of Clause 10, wherein the classification comprises categorizing each set of input, of the set of inputs, wherein each of the normalized set of inputs is categorized as having at least one of a (i) designated department of a user, or (ii) location information of an internet protocol (IP) address.

Clause 13—The computer-implemented method of Clause 11, wherein the classification is based on a policy or entity graph.

Clause 14—The computer-implemented method of Clause 10, wherein normalization of the set of inputs comprises transforming the set of inputs into a uniform format for processing.

Clause 15—The computer-implemented method of Clause 10, further comprising:

prior to clustering the vectorized data:

embedding a graph to represent a relationship of the vectorized data; or embedding a large language model (LLM) embedding to represent an attribute of the vectorized data.

Clause 16—The computer-implemented method of Clause 10, wherein the vectorized data is stored in a run-time vector database.

Clause 17—The computer-implemented method of Clause 10, wherein generating, by a machine learning model, vectorized data based on the normalized and classified set of inputs includes generating a run-time vector database, wherein the run-time vector database includes the vectorized data and additional information.

Clause 18—The computer-implemented method of Clause 10, wherein the additional information includes processing results associated with at least the normalization on the set of inputs or the classification of the normalized set of inputs.

Clause 19—The computer-implemented method of Clause 10, wherein identifying the similarity of existing alert clusters is based on least one or more correlation rules.

Clause 20—The computer-implemented method of Clause 10, wherein identifying the similarity of existing alert clusters is based on at least one or more correlation rules.

Clause 21—The computer-implemented method Clause 10, wherein identifying the similarity of existing alert clusters is based on a machine learning model.

Clause 22—The computer-implemented method of Clause 20, wherein one or more correlation rules are configured to prioritize processing over the machine learning model.

Clause 23—One or more non-transitory computer-readable media storing non-transitory computer-executable instructions that, when executed via one or more processors, cause one or more computing devices to:

receive a set of inputs from a plurality of third-party sources, wherein the set of inputs comprise at least one of streaming data or historical data;

perform normalization on the set of inputs;

perform classification of the normalized set of inputs;

generate, by a machine learning model, vectorized data based on the normalized and classified set of inputs, wherein the vectorized data indicates at least one of a (i) signal type, (ii) network environment, or (iii) objective; and generate clusters of alerts based on the vectorized data by identifying a similarity of existing alert clusters.

Clause 24—The one or more non-transitory computer-readable media of Clause 23, wherein identifying the similarity of existing alert clusters is based at least on one or more correlation rules.

Clause 25—The one or more non-transitory computer-readable media of Clause 23, wherein identifying the similarity of existing alert clusters is based at least on a machine learning model.

Clause 26—The one or more non-transitory computer-readable media of Clause 23, wherein identifying the similarity of existing alert clusters is based a combination of machine learning model and one or more correlation rules.

Clause 1—In accordance with other aspects, a risk modeling system, method and computer-readable media are provided. The include a system for modeling computer risk, the system configured to:

receive a set of inputs from a plurality of third-party sources, wherein the set of inputs comprise at least one of streaming data or historical data; and characterize, by a risk modeling component of the system, risk model inputs based on (i) normalized and classified versions of the set of inputs, (ii) vectorized data comprising the set of inputs, and (iii) clusters of alerts comprising the set of inputs, wherein risk modeling component is configured to derive at least one attack graph corresponding to the characterized risk model inputs emulate the computer threat or attack; and determine a risk score based on the derived attack graph.

Clause 2—The system as recited in Clause 1, wherein each attack path of attack paths in the attack graph comprises of one or more attack steps, wherein the directed graph structure is a node tree where each node represents a single attack step of the one or more attack steps and an associated entity of the single attack step.

Clause 3—The system as recited in Clause 2, wherein one or more entry points are identified by determining attack paths within a directed graph structure.

Clause 4—The system as recited in Clause 3, wherein nodes of the node tree in the attack graphs define the one or more entry points.

Clause 5—The system as recited in Clause 2, wherein one or more choke points are identified the derived attack graph.

Clause 6—The system as recited in Clause 2, wherein each attack path of the attack paths comprises of one or more attack steps, wherein the directed graph structure is a node tree where each node represents a single attack step of the one or more attack steps and an associated entity of the single attack step.

Clause 7—The system as recited in Clause 6, wherein a single attack step of the one or more attack steps may indicate a technique from a plurality of defined sources.

Clause 8—The system as recited in Clause 2, wherein the attack paths are determined by extracting minimum spanning trees (MST) from the directed graph structure, where the MST comprises single entry points for targeting one or more entities.

Clause 9—The system as recited in Clause 1, wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, (vi) any vulnerabilities or weakness of assets or entities or (vii) the source of the set of inputs.

Clause 10—The system as recited in Clause 1, wherein the risk modeling component is further configured to determine a threshold monetary value for each asset is identified at least by characterizing a likely impact to a network environment associated with each asset; and based on the impact score of the asset; based on the determined risk appetite of the impacted entities and based on a determined successful attack or disruption to the network environment.

Clause 11—The system as recited in Clause 10, wherein impact score for assets and entities are modelled based on (i) the observed behavior and attributes of entities (ii) analyzing the targets of recent attacks and campaigns from the news media that are current and relevant.

Clause 12—The system as recited in Clause 10, wherein the risk characterization is modeled by (i) an impact score of the entity and (ii) a nature of information or data that is governed by the entity including but not limited to personally identifiable information (PII) or financial details of the organization or authentication data Clause 13—The system as recited in Clause 1, wherein the risk score is determined by identifying a (i) likelihood of the computer threat or attack, (ii) impact of the computer threat or attack, and (iii) a confidence value of the computer threat or attack.

Clause 14—The system as recited in Clause 13, wherein the determined risk score corresponds to individual scores for each of the (i) likelihood of the computer threat or attack, (ii) impact of the computer threat or attack, and (iii) a confidence value of the computer threat or attack Clause 15—A method comprising:

receiving a set of inputs from a plurality of third-party sources, wherein the set of inputs comprise at least one of streaming data or historical data; and characterizing computer threats or attacks based on (i) normalized and classified versions of the set of inputs, (ii) vectorized data comprising the set of inputs, and (iii) clusters of alerts comprising the set of inputs, wherein risk modeling component is configured to generate an attack graph based on the characterization;

determining a risk score based on the attack graph.

Clause 16—The method as recited in Clause 15 wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, or (vi) the source of the set of inputs.

Clause 17—The method as recited in Clause 15, further comprising determining a threshold monetary value for each asset is identified at least by characterizing a likely impact to a network environment associated with each asset and based on a determined successful attack or disruption to the network environment.

Clause 18—The method as recited in Clause 15, wherein the risk score is determined by identifying a (i) likelihood of the computer threat or attack, (ii) impact of the computer threat or attack, and (iii) a confidence value of the computer threat or attack.

Clause 19—The method as recited in Clause 18, wherein the risk score correspond to individual scores associated with the (i) likelihood of the computer threat or attack, (ii) impact of the computer threat or attack, and (iii) a confidence value of the computer threat or attack.

Clause 20—The method as recited in Clause 10, wherein computer threats or attacks are further characterized by using a supervised machine learning model to identify attack patterns in the set of inputs.

Clause 21—One or more non-transitory computer-readable media storing non-transitory computer-executable instructions that, when executed via one or more processors, cause one or more computing devices to:

receive a set of inputs from a plurality of third-party sources, wherein the set of inputs comprise at least one of streaming data or historical data; and characterize, by a risk modeling component of the system, computer threats or attacks based on (i) normalized and classified versions of the set of inputs, (ii) vectorized data comprising the set of inputs, and (iii) clusters of alerts comprising the set of inputs, wherein risk modeling component is configured to:

identify one or more entry points of the computer threat or attack;

identify a threshold monetary value for each asset associated with the set of inputs;

emulate the computer threat or attack; and determine a risk score.

Clause 22—The one or more non-transitory computer-readable media of Clause 21, wherein the computer threat or attack is emulated such that the one or entry points are identified by determining attack paths within a directed graph structure for the computer threats or attacks, wherein the attack paths are generated based on the sets of inputs and using graph analytics techniques of centrality and in-degree using the sets of inputs.

Clause 23—The one or more non-transitory computer-readable media of Clause 22, wherein each attack path of the attack paths comprise of one or more attack steps, wherein the directed graph structure is a node tree where each node represents a single attack step of the one or more attack steps and an associated entity of the single attack step.

Clause 24—The one or more non-transitory computer-readable media of Clause 23, wherein a single attack step of the one or more attack steps may indicate a set of defined attack techniques.

Clause 25—The one or more non-transitory computer-readable media of Clause 21, wherein the attack paths are determined by extracting minimum spanning trees (MST) from the directed graph structure, where the MST comprises single entry points for targeting one or more entities.

The one or more non-transitory computer-readable media of Clause 21, wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, or (vi) the source of the set of inputs.

In accordance with yet other aspects a third party modeling system, method and computer-readable media is provided.

Clause 1—A system for monitoring third-party services for computer risk, the system configured to:

receive a set of inputs from a plurality of independent sources, wherein the set of inputs comprise at least information regarding third-party service providers; and determine, via a third-party monitoring services component of the system, for configuring third-party content sources, rules for monitoring and alerting on the content sources of the third-party service providers, wherein the third-party monitoring services component is configured to:

use header tracing component to discover and manage service dependencies and maps based on processing results from the header tracing component, configure new content sources or modify existing content source configurations to include or exclude missing fields or information.; and based the processing results from the header tracking component, detect configuration and setup of monitoring and alerting rules on the third party monitoring services.

Clause 2—The system as recited in Clause 1, wherein the third-party monitoring services component identifies new content sources based on at least one of analyzing types of data to monitor and examining existing gaps on the third party monitoring systems.

Clause 3—The system as recited in Clause 2, wherein the monitoring gaps are derived by comparing discovered entities by these third party monitoring systems and determining if there is any missing information from those entities.

Clause 4—The system as recited in Clause 3, wherein the third-party monitoring services component is further configured to classify observed entities into high-level categories, such as Databases, based on their characteristics (e.g., MySQL, BigQuery, PostgreSQL classified as Databases).

Clause 5—The system as recited in Clause 4, wherein the third-party monitoring services component is further configured to at least one of maintain and update a database of log types and fields captured by categories, using a combination of expert training and observed configurations.

Clause 6—The system as recited in Clause 5, wherein the third-party monitoring services component is further configured to compare database of log types and fields with observed entities to determine gaps in the monitoring coverage.

Clause 7—The system as recited in Clause 6, wherein the third-party monitoring services component is further configured to recommend actions based on the determined gaps, wherein the recommended actions, upon user approval, automatically configure new content sources.

Clause 8—The system as recited in Clause 1, wherein the third-party monitoring services component is further configured to detect the optimal configuration and setup of third party detection and monitoring tools in cloud environments, taking into account the dynamic changes in infrastructure and budget restrictions.

Clause 9—The system as recited in Clause 8, wherein the third-party monitoring services component is further configured to receive inputs from other subcomponents, such as entity impact analysis and detection coverage, which provide information about risky entry points, chokepoints, and high-value assets (HVAs).

Clause 10—The system as recited in Clause 9, wherein the third-party monitoring services component is further configured to classify determine gaps in the existing detection and observability coverage by comparing it with frameworks such as MITRE ATT&CK, NIST, SRE golden signals, and others.

Clause 11—The system as recited in Clause 10, wherein the third-party monitoring services component is further configured to classify generate recommendations for setting up new tools, configuring parameters, or fine-tuning existing setups to enhance the overall detection and observability capabilities.

Clause 12—The system as recited in Clause 11, wherein the third-party monitoring services component is further configured to classify run continuously to identify gaps in the monitoring and detection configuration, and provide recommendations to the user for approval.

Clause 13—A method comprising:

receiving a set of inputs from a plurality of independent sources, wherein the set of inputs comprise at least information regarding third-party service providers; and determining, via a third-party monitoring services component of the system, for configuring third-party content sources, rules for monitoring and alerting on the content sources of the third-party service providers, wherein the third-party monitoring services component is configured to:

discovering and managing service dependencies and maps to form processing results;

based on processing results, configuring new content sources or modify existing content source configurations to include or exclude missing fields or information.; and based the processing results detecting configuration and setup of monitoring and alerting rules on the third party monitoring services.

Clause 14—The method as recited in Clause 13, wherein the intelligence on new content sources and modifications to existing content sources is derived from analyzing the types of data to monitor and examining existing gaps on the third party monitoring methods.

Clause 15—The method as recited in Clause 14, further comprising classifying observed entities into high-level categories, such as Databases, based on their characteristics (e.g., MySQL, BigQuery, PostgreSQL classified as Databases).

Clause 17—The method as recited in Clause 15, further comprising maintaining and updating a database of log types and fields captured by categories, using a combination of expert training and observed configurations.

Clause 18—The method as recited in Clause 16, further comprising comparing the database of log types and fields with observed entities to determine gaps in the monitoring coverage.

Clause 19—The method as recited in Clause 17, further comprising triggering recommended actions based on the determined gaps, wherein the recommended actions, upon user approval, automatically configure new content sources.

Clause 20—The method as recited in Clause 13, further comprising continuously detecting the optimal configuration and setup of third party detection and monitoring tools in cloud environments, taking into account the dynamic changes in infrastructure and budget restrictions.

Clause 21—The method as recited in Clause 19, further comprising receiving inputs from other subcomponents, such as entity impact analysis and detection coverage, which provide information about risky entry points, chokepoints, and high-value assets (HVAs).

Clause 22—The method as recited in Clause 20, further comprising: determining gaps in the existing detection and observability coverage.

Clause 23—The method as recited in Clause 21, further comprising generating recommendations for setting up new tools, configuring parameters, or fine-tuning existing setups to enhance the overall detection and observability capabilities.

Clause 24—The method as recited in Clause 22, further comprising running continuously to identify gaps in the monitoring and detection configuration, and providing recommendations to the user for approval.

In accordance with further aspects, an adaptive configuration and fine tuning component, method and computer-readable media are provided.

Clause 1—A system for monitoring third-party services, the system configured to:

receive inputs from a plurality third-party sources, wherein the plurality of third-party sources include streaming data or historical data; and characterize rules and models for detecting organizational attributes, wherein the organizational attributes include at least one of computer threats, attacks, performance bottlenecks, or availability issues, and other indicators of potential risk for the organization and wherein the characterization of the rules and models is based on:

(i) gaps in detection coverage;

(ii) system updates with the latest known Tactics, Techniques, and Procedures (TTPs), techniques, or compliance controls; and (iii) consistency across multiple tenants.

Clause 2—The system as recited in Clause 1, wherein the system is further configured to derive fine-tuning recommendations.

Clause 3—The system as recited in Clause 2, wherein the system derives fine-tuning recommendations by being configured to:

(i) analyze observed entities, their classification, and the analysis of targets, entry points, or chokepoints;

(ii) examine the types of log sources;

(iii) examine the types of existing signal detection policies, such as threats, behavioral models, threat feeds, attack surface exposures, emerging threats, latency, traffic, errors, and saturation;

(iv) assess the customer's compliance controls (e.g., PCI, SOC2, etc.), which is received as input to the system and their current status by analyzing the output from a risk modeling process; and (v) identify trending threats that are relevant to the customer and their Tactics, Techniques, and Procedures (TTPs).

Clause 4—The system as recited in Clause 1, further comprising a recommendations module that generates fine-tuning recommendations.

Clause 5—The system as recited in Clause 4, wherein the fine-tuning recommendations correspond to improving precision or breadth of the existing detection specifications.

Clause 6—The system as recited in Clause 4, wherein the fine-tuning recommendations correspond to create new detections to fill gaps in coverage.

Clause 7—The system as recited in Clause 6, wherein detections to fill gaps are based on at least one of a rule-based mechanisms, a signature or pattern matching, machine learning (ML) model-based mechanisms, or anomaly-based detection.

Clause 8—The system as recited in Clause 4, wherein the fine-tuning recommendations correspond to optimize existing policies by combining rules and models that may have redundancy or overlapping coverage, and identifying ineffective rules.

Clause 9—The system as recited in Clause 1, further comprising a system for the generation of configuration updates.

Clause 10—The system as recited in Clause 9, wherein the system for the generation of configuration updates includes a system for expressing signal detection models and policies as code using a declarative language such as YAML.

Clause 11—The system as recited in Clause 9, wherein the system for the generation of configuration updates includes a system for creating prompts for the generative AI based on the derived intelligence.

Clause 12—The system as recited in Clause 9, wherein the system for the generation of configuration updates includes a system for allowing users to review and approve the generated recommendations before deploying them either for a specific tenant or across multiple tenants.

Clause 13—The system as recited in Clause 9, wherein the system for the generation of configuration updates includes a system for utilizing allowing users to review and approve the generated recommendations before deploying them either for a specific tenant or across multiple tenants.

Clause 14—A method for monitoring third-party services, the system configured to:

receiving inputs from a plurality third-party sources, wherein the plurality of third-party sources include streaming data or historical data; and characterizing rules and models for detecting organizational attributes, wherein the organizational attributes include at least one of computer threats, attacks, performance bottlenecks, or availability issues, and other indicators of potential risk for the organization.

Clause 15—The method as recited in Clause 14, wherein the characterization of the rules and models is based on at least one of:

(i) gaps in detection coverage;

(ii) system updates with the latest known Tactics, Techniques, and Procedures (TTPs), techniques, or compliance controls; and (iii) consistency across multiple tenants.

Clause 16—The method as recited in Clause 14, further comprising deriving fine-tuning recommendations.

Clause 17—The method as recited in Clause 16, wherein deriving fine-tuning recommendation includes deriving fine-tuning recommendations based on:

(i) analyze observed entities, their classification, and the analysis of targets, entry points, or chokepoints;

(ii) examine the types of log sources;

(iii) examine the types of existing signal detection policies, such as threats, behavioral models, threat feeds, attack surface exposures, emerging threats, latency, traffic, errors, and saturation;

(iv) assess the customer's compliance controls (e.g., PCI, SOC2, etc.), which is received as input to the system and their current status by analyzing the output from a risk modeling process; and (v) identify trending threats that are relevant to the customer and their Tactics, Techniques, and Procedures (TTPs).

Clause 18—The method as recited in Clause 14, further comprising generating fine-tuning recommendations.

Clause 19—The method as recited in Clause 18, wherein the fine-tuning recommendations correspond to improve precision or breadth of the existing detection specifications.

Clause 20—The method as recited in Clause 18, wherein the fine-tuning recommendations correspond to create new detections to fill gaps in coverage.

Clause 21—The method as recited in Clause 20, wherein detections to fill gaps are based on at least one of a rule-based mechanisms, a signature or pattern match, machine learning (ML) model-based mechanisms, or anomaly-based detection.

Clause 22—The method as recited in Clause 18, wherein the fine-tuning recommendations correspond to optimize existing policies by combining rules and models that may have redundancy or overlapping coverage, and identifying ineffective rules.

Clause 23—The method as recited in Clause 14, further comprising generating configuration updates.

Clause 24—The method as recited in Clause 14, further comprising expressing signal detection models and policies as code using a declarative language such as YAML.

Clause 25—The system as recited in Clause 14, further comprising utilizing generative AI techniques to generate or update existing signal detection policies, which are expressed as code.

In accordance with further aspects a threat hunting method, system and computer-readable medium are provided.

Clause 1—A system for identifying computer risks, the system configured to:

receive inputs from various third-party sources, including streaming data and historical data;

identify computer risks based on the received inputs using a hypothesis generation component, wherein the hypothesis generation is designed to:

identify the computer risk as a first computer risk based on the current state of a network environment associated with the observed inputs;

identify the computer risk as a second computer risk based on changes to the risk profile of entry points and known vulnerabilities of the network environment. These changes impact a modeled network environment derived from the actual network environment;

identify the computer risk as a third computer risk based on critical attack path predictions that cross a predetermined threshold; and evaluate the identified computer risks using the hypothesis generation component to:

prioritize the computer risks against other identified risks based on risk scores;

identify threat hunting hypotheses for each type of risk; and identify mitigation techniques for the prioritized risks.

Clause 2—The system as recited in Clause 1, wherein the system is further configure to identify prioritized risks resulting from observed attack signals.

Clause 3—The system as recited in Clause 2, further comprising a threat hunting model that generates hypotheses characterized by:

breaking down the likelihood of the attack from the risk model into a sequential set of hunting steps; and providing reasoning behind the likelihood and impact of each step; and generating threat hunting queries and providing information.

Clause 4—The system as recited in Clause 3, wherein the threat hunting model is based on examining the number of attack steps and their position in at least one of an attack flow or kill chain;

identifying any existing weaknesses in the impacted assets and providing steps to confirm possible exploitation of those weaknesses and gather evidence;

measuring the propagation of the attack and providing threat hunting steps for gathering evidence of propagation; and examining the last observed attack step on the target and providing steps for confirming the observed attack and gathering evidence.

Clause 5—The system as recited in Clause 3, wherein the system is configured to utilize large language models in the user's preferred language to generate the reasoning and threat hunting steps in natural language.

Clause 6—The system as recited in Clause 5, wherein the system is configured to generate threat hunting queries for each step using query languages specific to the third-party monitoring systems.

Clause 7—The system as recited in Clause 6, wherein the system is configured to generate threat hunting queries that incorporate the detection techniques corresponding to the MITRE ATT&CK technique and one or more impacted entities.

Clause 8—The system as recited in Clause 6, wherein the system is configured to generate threat hunting queries that incorporate any identified characterized weaknesses in the system.

Clause 9—The system as recited in Clause 8, wherein the characterized weaknesses include at least one of entry points, choke points and targets, possibly identified by a CVE identifier.

Clause 10—A method for identifying computer risks, comprising receiving inputs from various third-party sources, including streaming data and historical data;

identifying computer risks based on the received inputs using a hypothesis generation component, wherein the hypothesis generation is designed to:

identify the computer risk as a first computer risk based on the current state of a network environment associated with the observed inputs;

identify the computer risk as a second computer risk based on changes to the risk profile of entry points and known vulnerabilities of the network environment. These changes impact a modeled network environment derived from the actual network environment;

identify the computer risk as a third computer risk based on critical attack path predictions that cross a predetermined threshold; and evaluating the identified computer risks using the hypothesis generation component.

Clause 11—The method as recited in Clause 10, wherein the hypothesis generation component is configure to:

prioritize the computer risks against other identified risks based on risk scores;

identify threat hunting hypotheses for each type of risk; and identify mitigation techniques for the prioritized risks.

Clause 12—The method as recited in Clause 10, further comprising identifying prioritized risks resulting from observed attack signals.

Clause 13—The method as recited in Clause 12, further comprising implementing a threat hunting model that generates hypotheses characterized by:

breaking down the likelihood of the attack from the risk model into a sequential set of hunting steps; and providing reasoning behind the likelihood and impact of each step; and generating threat hunting queries and providing information.

Clause 14—The method as recited in Clause 13, wherein the threat hunting model is based on examining the number of attack steps and their position in at least one of an attack flow or kill chain;

identifying any existing weaknesses in the impacted assets and providing steps to confirm possible exploitation of those weaknesses and gather evidence;

measuring the propagation of the attack and providing threat hunting steps for gathering evidence of propagation; and examining the last observed attack step on the target and providing steps for confirming the observed attack and gathering evidence.

Clause 15—The method as recited in Clause 13, wherein the system is configured to utilize large language models in the user's preferred language to generate the reasoning and threat hunting steps in natural language.

Clause 16—The method as recited in Clause 15, wherein the system is configured to generate threat hunting queries for each step using query languages specific to the third-party monitoring systems.

Clause 17—The method as recited in Clause 16, wherein the system is configured to generate threat hunting queries that incorporate the detection techniques corresponding to the MITRE ATT&CK technique and one or more impacted entities.

Clause 18—The method as recited in Clause 16, wherein the system is configured to generate threat hunting queries that incorporate any identified characterized weaknesses in the system.

Clause 19—The method as recited in Clause 18, wherein the characterized weaknesses include at least one of entry points, choke points and targets, possibly identified by a CVE identifier.

Clause 20—A method for identifying computer risks, comprising receiving inputs from various third-party sources, including streaming data and historical data;

identifying computer risks based on the received inputs using a hypothesis generation component;

identifying the computer risk as a third computer risk based on critical attack path predictions that cross a predetermined threshold; and evaluating the identified computer risk.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of external computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable external computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for modeling computer risk, the system configured to:
   receive a set of inputs from a plurality of third-party sources, wherein the set of inputs comprise at least one of streaming data or historical data;
   characterize, by a risk modeling component of the system, risk model inputs based on (i) normalized and classified versions of the set of inputs, (ii) vectorized data comprising the set of inputs, wherein the vectorized data is generated using graph embeddings to represent relationships between entities in the set of inputs, and large language model (LLM) embeddings to represent semantic attributes of text-based input signals in the set of inputs, and (iii) clusters of alerts comprising the set of inputs, wherein threat modeling component is configured to derive at least one attack graph corresponding to the characterized risk model inputs;
   emulate the computer threat or attack; and
   determine a risk score based on the derived attack graph.

2. The system as recited in claim 1, wherein each attack path of attack paths in the attack graph comprises of one or more attack steps, wherein the attack graph is a node tree where each node represents a single attack step of the one or more attack steps and an associated entity of the single attack step.

3. The system as recited in claim 2, wherein one or more entry points are identified by determining attack paths within a directed graph structure.

4. The system as recited in claim 3, wherein nodes of the node tree in the attack graphs define the one or more entry points.

5. The system as recited in claim 2, wherein one or more choke points are identified the derived attack graph.

6. The system as recited in claim 2, wherein each attack path of the attack paths comprises of one or more attack steps, wherein the attack graph is a node tree where each node represents a single attack step of the one or more attack steps and an associated entity of the single attack step.

7. The system as recited in claim 6, wherein a single attack step of the one or more attack steps may indicate a technique from a plurality of defined sources.

8. The system as recited in claim 2, wherein the attack paths are determined by extracting minimum spanning trees (MST) from the attack graph, where the MST comprises single entry points for targeting one or more entities.

9. The system as recited in claim 1, wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, (vi) any vulnerabilities or weakness of assets or entities or (vii) the source of the set of inputs.

10. The system as recited in claim 9, wherein the risk modeling component is further configured to:
    determine a threshold monetary value for each asset is identified at least by characterizing a likely impact to a network environment associated with each asset;
    based on the risk score of the asset; and
    based on a determined risk appetite of the impacted entities and based on a determined successful attack or disruption to the network environment.

11. The system as recited in claim 10, wherein risk score for assets and entities are modelled based on (i) observed behavior and attributes of entities (ii) analyzing targets of recent attacks and campaigns from news media that are current and relevant.

12. The system as recited in claim 10, wherein the risk characterization is modelled by (i) risk score of the entity (ii) nature of information or data that is governed by the entity including but not limited to personally identifiable information (PIT), financial details of an organization, and authentication data.

13. The system as recited in claim 1, wherein the risk score is determined by identifying a (i) likelihood of the computer threat or attack, (ii) impact of the computer threat or attack, and (iii) a confidence value of the computer threat or attack.

14. The system as recited in claim 13, wherein the determined risk score corresponds to individual scores for each of the (i) likelihood of the computer threat or attack, (ii) impact of the computer threat or attack, and (iii) a confidence value of the computer threat or attack.

15. A method comprising:
    receiving a set of inputs from a plurality of third-party sources, wherein the set of inputs comprise at least one of streaming data or historical data;
    characterizing computer threats or attacks based on (i) normalized and classified versions of the set of inputs, (ii) vectorized data comprising the set of inputs, wherein the vectorized data is generated using graph embeddings to represent relationships between entities in the set of inputs, and large language model (LLM) embeddings to represent semantic attributes of text-based input signals in the set of inputs, and (iii) clusters of alerts comprising the set of inputs, wherein threat modeling component is configured to generate an attack graph based on the characterization; and
    determining a risk score based on the attack graph.

16. The method as recited in claim 15 wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, or (vi) the source of the set of inputs.

17. The method as recited in claim 15, further comprising determining a threshold monetary value for each asset is identified at least by characterizing a likely impact to a network environment associated with each asset and based on a determined successful attack or disruption to the network environment.

18. The method as recited in claim 15, wherein the risk score is determined by identifying a (i) likelihood of the computer threat or attack, (ii) impact of the computer threat or attack, and (iii) a confidence value of the computer threat or attack.

19. The method as recited in claim 18, wherein the risk score correspond to individual scores associated with the (i) likelihood of the computer threat or attack, (ii) impact of the computer threat or attack, and (iii) a confidence value of the computer threat or attack.

20. The method as recited in claim 15, wherein computer threats or attacks are further characterized by using a supervised machine learning model to identify attack patterns in the set of inputs.

21. One or more non-transitory computer-readable media storing non-transitory computer-executable instructions that, when executed via one or more processors, cause one or more computing devices to:

receive a set of inputs from a plurality of third-party sources, wherein the set of inputs comprise at least one of streaming data or historical data; and characterize, by a threat modeling component, computer threats or attacks based on (i) normalized and classified versions of the set of inputs, (ii) vectorized data comprising the set of inputs, wherein the vectorized data is generated using graph embeddings to represent relationships between entities in the set of inputs, and large language model (LLM) embeddings to represent semantic attributes of text-based input signals in the set of inputs, and (iii) clusters of alerts comprising the set of inputs, wherein threat modeling component is configured to:

identify one or more entry points of the computer threat or attack;

identify a threshold monetary value for each asset associated with the set of inputs; emulate the computer threat or attack; and determine a risk score.

22. The one or more non-transitory computer-readable media of claim 21, wherein the computer threat or attack is emulated such that the one or entry points are identified by determining attack paths within a directed graph structure for the computer threats or attacks, wherein the attack paths are generated based on the sets of inputs and using graph analytics techniques of centrality and in-degree using the sets of inputs.

23. The one or more non-transitory computer-readable media of claim 22, wherein each attack path of the attack paths comprise of one or more attack steps, wherein the directed graph structure is a node tree where each node represents a single attack step of the one or more attack steps and an associated entity of the single attack step.

24. The one or more non-transitory computer-readable media of claim 23, wherein a single attack step of the one or more attack steps may indicate a set of defined attack techniques.

25. The one or more non-transitory computer-readable media of claim 22, wherein the attack paths are determined by extracting minimum spanning trees (MST) from the directed graph structure, where the MST comprises single entry points for targeting one or more entities.

26. The one or more non-transitory computer-readable media of claim 21, wherein the set of inputs comprise of at least one of (i) threat or attack occurrence time, (ii) threat or attack adversary trajectory, (iii) network communications, (iv) Adversarial Tactics, Techniques, and Common Knowledge (ATT&CK) propagation, (v) impacted entities, or (vi) the source of the set of inputs.

* * * * *